US007330856B2

(12) United States Patent
Nicastro et al.

(10) Patent No.: US 7,330,856 B2
(45) Date of Patent: Feb. 12, 2008

(54) ITEM SPECIFICATION OBJECT MANAGEMENT SYSTEM

(75) Inventors: Cherisse M. Nicastro, Las Vegas, NV (US); Thomas A. Wucherer, Las Vegas, NV (US); W. Todd Nisbet, Las Vegas, NV (US); Anthony A. Marnell, II, Las Vegas, NV (US); Anthony A. Marnell, III, Las Vegas, NV (US)

(73) Assignee: Tririga LLC, Las Vegas, NV (US)

( * ) Notice: Subject to any disclaimer, the term of this patent is extended or adjusted under 35 U.S.C. 154(b) by 105 days.

(21) Appl. No.: 10/015,903

(22) Filed: Oct. 30, 2001

(65) Prior Publication Data

US 2002/0077939 A1 Jun. 20, 2002

Related U.S. Application Data

(60) Provisional application No. 60/246,276, filed on Nov. 6, 2000, provisional application No. 60/246,275, filed on Nov. 6, 2000, provisional application No. 60/244,492, filed on Oct. 30, 2000, provisional application No. 60/244,457, filed on Oct. 30, 2000, provisional application No. 60/244,493, filed on Oct. 30, 2000, provisional application No. 60/244,485, filed on Oct. 30, 2000.

(51) Int. Cl.
G06F 17/00 (2006.01)
G06F 12/00 (2006.01)
G06K 153/00 (2006.01)
(52) U.S. Cl. ........................................ 707/103; 705/29
(58) Field of Classification Search ................ 707/103; 705/29
See application file for complete search history.

(56) References Cited

U.S. PATENT DOCUMENTS

| 4,578,768 | A |   | 3/1986  | Racine            |
|-----------|---|---|---------|-------------------|
| 4,700,318 | A | * | 10/1987 | Ockman ...... 345/595 |
| 4,799,156 | A |   | 1/1989  | Shavit et al.     |
| 4,870,576 | A |   | 9/1989  | Tornetta          |
| 4,970,666 | A |   | 11/1990 | Welsh et al.      |
| 4,972,318 | A |   | 11/1990 | Brown et al.      |
| 4,992,940 | A |   | 2/1991  | Dworkin           |

(Continued)

FOREIGN PATENT DOCUMENTS

EP 0 959 421 A 11/1999

(Continued)

OTHER PUBLICATIONS http://www.fedcenter.com printed May 22, 2000.

(Continued)

*Primary Examiner*—Etienne P Leroux
*Assistant Examiner*—Cindy Nguyen
(74) *Attorney, Agent, or Firm*—Vierra Magen Marcus & DeNiro LLP

(57) ABSTRACT

A system and method for constructing data concerning items of an asset. The method comprises: providing a user data entry interface; receiving a plurality of data values, each into a data field of the interface, wherein the plurality of data fields comprise a specification for the item and each data field of the specification describes an attribute of the item, and storing the specification into a database on a computer system. The system includes a data store for item specification data provided on a host computer coupled to a network; and a data input toolset comprising at least an item type manager and an item specification manager.

50 Claims, 30 Drawing Sheets

U.S. PATENT DOCUMENTS

| | | | |
|---|---|---|---|
| 5,189,606 A | 2/1993 | Burns et al. | |
| 5,293,479 A | 3/1994 | Quintero et al. | |
| 5,303,144 A | 4/1994 | Kawashima et al. | |
| 5,357,439 A * | 10/1994 | Matsuzaki et al. | 700/96 |
| 5,434,994 A | 7/1995 | Shaheen et al. | |
| 5,526,520 A | 6/1996 | Krause | |
| 5,528,490 A | 6/1996 | Hill | |
| 5,570,291 A * | 10/1996 | Dudle et al. | 700/95 |
| 5,655,118 A | 8/1997 | Heindel et al. | |
| 5,666,493 A | 9/1997 | Wojcik et al. | |
| 5,668,736 A | 9/1997 | Douglas et al. | |
| 5,689,705 A | 11/1997 | Fino et al. | |
| 5,694,551 A | 12/1997 | Doyle et al. | |
| 5,710,887 A | 1/1998 | Chelliah et al. | |
| 5,715,314 A | 2/1998 | Payne et al. | |
| 5,742,931 A | 4/1998 | Spiegelhoff et al. | |
| 5,754,850 A | 5/1998 | Janssen | |
| 5,755,072 A | 5/1998 | Lingafelter | |
| 5,758,327 A | 5/1998 | Gardner et al. | |
| 5,758,328 A | 5/1998 | Giovannoli | |
| 5,761,674 A | 6/1998 | Ito | |
| 5,765,142 A | 6/1998 | Allred et al. | |
| 5,768,142 A | 6/1998 | Jacobs | |
| 5,793,632 A | 8/1998 | Fad et al. | |
| 5,799,286 A | 8/1998 | Morgan et al. | |
| 5,799,318 A | 8/1998 | Cardinal et al. | |
| 5,815,829 A | 9/1998 | Zargar | |
| 5,826,252 A | 10/1998 | Wolters, Jr. et al. | |
| 5,832,494 A | 11/1998 | Egger et al. | |
| 5,842,178 A | 11/1998 | Giovannoli | |
| 5,847,971 A | 12/1998 | Ladner et al. | |
| 5,848,410 A | 12/1998 | Walls et al. | |
| 5,859,847 A | 1/1999 | Dew et al. | |
| 5,873,076 A | 2/1999 | Barr et al. | |
| 5,875,110 A | 2/1999 | Jacobs | |
| 5,893,082 A | 4/1999 | McCormick | |
| 5,895,454 A | 4/1999 | Harrington | |
| 5,899,980 A | 5/1999 | Wilf et al. | |
| 5,903,877 A | 5/1999 | Berkowitz et al. | |
| 5,918,227 A | 6/1999 | Polnerow et al. | |
| 5,924,094 A | 7/1999 | Sutter | |
| 5,926,798 A | 7/1999 | Carter | |
| 5,931,907 A | 8/1999 | Davies et al. | |
| 5,932,459 A | 8/1999 | Sittinger et al. | |
| 5,940,820 A | 8/1999 | Kagiwada | |
| 5,946,665 A | 8/1999 | Suzuki et al. | |
| 5,950,173 A | 9/1999 | Perkowski | |
| 5,950,206 A * | 9/1999 | Krause | 707/104.1 |
| 5,956,709 A | 9/1999 | Xue | |
| 5,970,472 A | 10/1999 | Allsop et al. | |
| 5,970,475 A | 10/1999 | Barnes et al. | |
| 5,970,490 A | 10/1999 | Morgenstern | |
| 5,974,395 A | 10/1999 | Bellini et al. | |
| 5,983,010 A | 11/1999 | Murdock et al. | |
| 5,983,101 A | 11/1999 | Billstrom | |
| 5,991,535 A | 11/1999 | Fowlow et al. | |
| 5,999,915 A | 12/1999 | Nahan et al. | |
| 6,002,855 A | 12/1999 | Ladner et al. | |
| 6,003,039 A | 12/1999 | Barry et al. | |
| 6,009,413 A | 12/1999 | Webber et al. | |
| 6,012,066 A | 1/2000 | Discount et al. | |
| 6,014,644 A | 1/2000 | Erickson | |
| 6,016,478 A * | 1/2000 | Zhang et al. | 705/9 |
| 6,026,376 A | 2/2000 | Kenney | |
| 6,029,165 A | 2/2000 | Gable | |
| 6,029,174 A | 2/2000 | Sprenger et al. | |
| 6,035,293 A | 3/2000 | Lantz et al. | |
| 6,037,945 A | 3/2000 | Loveland | |
| 6,038,547 A | 3/2000 | Casto | |
| 6,044,205 A | 3/2000 | Reed et al. | |
| 6,047,290 A | 4/2000 | Kennedy et al. | |
| 6,056,556 A | 5/2000 | Bruan et al. | |
| 6,063,128 A * | 5/2000 | Bentley et al. | 703/6 |
| 6,064,982 A | 5/2000 | Puri | |
| 6,363,362 B1 | 3/2002 | Burfield et al. | |
| 6,789,252 B1 * | 9/2004 | Burke et al. | 717/100 |
| 2002/0025085 A1 * | 2/2002 | Gustafson et al. | 382/311 |

FOREIGN PATENT DOCUMENTS

| | | |
|---|---|---|
| JP | 07271569 A | 10/1995 |
| WO | WO 9838564 | 9/1998 |
| WO | WO 98 43155 A | 10/1998 |
| WO | WO 9933007 | 7/1999 |
| WO | WO 01 63449 A | 8/2001 |
| WO | WO 01 67279 A | 9/2001 |

OTHER PUBLICATIONS http://www.rent.net printed May 22, 2000.
http://www.apartments.com printed May 22, 2000.
http://www.us.buy.com printed May 22, 2000.
http://www.designmanager.com printed Mar. 6, 2002.
Thomas A. Wucherer, "An Architectural Design Program Computer Data Base" Dec. 1987.
Tom Field, "Reengineering the Engineering Business", CIO Magazine Feb. 1, 1998.
P. Kristoff, et al., "The Process Specification System for MMST", IEEE Transactions of Semiconductor Manufacturing, vol. 8, No. 3, Aug. 1995, pp. 262-271.
J. McGee, et al., "The MMST Computer-Integrated Manufacturing System Framework", IEEE Transactions on Semiconductor Manufacturing, vol. 7, No. 2, May 1994, pp. 107-116.
T-K Peng, et al., "A Step Toward STEP-Compatible Engineering Data Management: The Data Models of Product Structure and Engineering Changes", Robotics and Computer Integrat Manufacturing, vol. 14, No. 2, Apr. 1, 1998, pp. 89-109.
Hori, et al., "OpenMES: Scalable Manufacturing Execution Framework Based On Distributed Object Computing", Systems, Man and Cybernetics, 1999, IEEE SMC '99 Conf. Proceedings 1999 IEEE Int'l Conf., Tokyo, Japan, Oct. 12-15, 1999, pp. 398-403.

* cited by examiner

| Marnell Corrao Associate, Inc.<br>Interiors Specification<br>*Specification Number: 12451-1-3A-12* | Area / Item: 3A-12<br>Budget Group: 12541-1<br>Specification Group: Free Standing Furniture<br>Revision Number: 1<br>Issue Date: 8/30/99 |
|---|---|
| Project Name:<br>Rio - Palazzo Suites | Area: Palazzo 3A<br>Location: Living Room | Specifier:<br>Kathleen | Project Number:<br>MCA: 61797<br>AAM: 27797 |

Contractor Furnished / Contractor Installed

| Manufacturer: 97750<br>RB Callen Mfg., Inc.<br>920 No. Loren Avenue<br>Azusa, CA 91702<br>Phone: (626) 969-7871  Fax: (626) 969-8304<br>Specifier's Contact: John<br>Phone: (626) 969-7871  Fax: (626) 969-8304 | Distributor:<br><br><br><br>Phone:   Fax:<br>Specifier's Contact:<br><br>Phone:   Fax: 4 |
|---|---|
| Item Description:<br>Entertainment Center | Overall Dimensions: 99.75"W x 28"D x 85"H<br>Other Dimensions:<br>99.75"W x 28"/19.5"D x 85"/77.25"H |
| Manufacturer Catalog No:<br>Archive<br>#3904 / 3905L/ 3905R | Manufacturer Description:<br>Entertainment Unit - Center & Sides (Left & Right) |

| Quantity:<br>1 EA | Unit Price:<br>$ 9,177.50 | Total Estimated Price:<br>$9,177.50 | Budget:<br>$8,152.00 |
|---|---|---|---|
| Sample/Strike Off:<br>YES | Sample/Strike Off Lead Time:<br>3 weeks<br>Product Lead Time:<br>2 weeks | Sample/Strike-Off to: Kathleen<br>MCA<br>4495 S. Polaris Ave.<br>Las Vegas, NV 89103<br>Phone: (702) 739-9413  Fax: | |

Specification:

Finish: Presidio / #27 Winter Hi Polish

Notes:

* Wood Finish to have a French polish and sample to be submitted to MCA Interiors for approval.

* Interior Dimensions:

3904 Center
  Upper Section: 38"W x 21"D x 31"H
  Lower Section: 38"W x 22.5"D x 35"H
  Two Drawers (5.5"H) and adjustable shelves.
  Note: Interior for TV has cut out at rear of section for TV that is deeper than 21".

3904L & #3904R
  21 1/2"W x 18"D x 64 1/2"H
  Shelves are adjustable. Fixed shelf in center with 2 shelves above and 2 shelves below.Center shelf HVE 2 1/2" Adjustments.

* Spec Issued to Purchasing on 5/26/98.

Image:

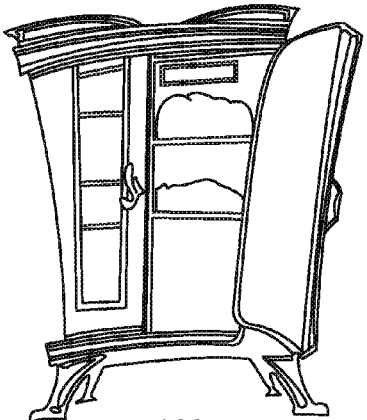

160

Linked Speficiations:

| Is COM? | Specification No. | Quantity | Description |
|---|---|---|---|
| ☐ | | | |

FIG. 1

Select Classification 810    Select Item Type 820

Classification tree:
- ALL CLASSIFICATIONS
  - 01000 - General Requireme
  - 02000 - Site Construction
  - 03000 - Concrete
  - 04000 - Masonry
  - 05000 - Metals
  - 06000 - Woods and Plastics
  - 07000 - Thermal and Moisture Pr
  - 08000 - Doors and Windows
  - 09000 - Finishes
  - 10000 - Specialties
  - 11000 - Equipment
  - 12000 - Furnishings
    - 12050 - Fabrics
    - 12100 - Art
    - 12300 - Manufactured Casewd
    - 12400 - Furnishings and Acces
    - 12500 - Furniture ~812
    - 12600 - Multiple Seating
    - 12700 - Systems Furniture
    - 12800 - Interior Plants and Pla

| Type Code | * | Type Name | Type Info |
|---|---|---|---|
| o 12500 | | Furniture Set | D |
| o 12510 | | Office Furniture | D |
| o 12520 | | Seating | D |
| o 12540 | | Hospitality Furniture | D |
| o 12560 | | Institutional Furniture | D |
| o 12580 | | Residential Seating (Residential Furniture) | D |
| o 12581 | | Free Standing Residential Furniture(Residential Furniture) | D |

☑ Display Default Item Types    (*) indicates that the Item Type has been retired

FIG. 8

| | | | |
|---|---|---|---|
| » Category | Custom | »Type | Text |
| » Name | Brand | »Label | Brand |
| Comment | Name of Manufacturer | | |
| » Start Row | 10 | »Row Span | 1 |
| Default Value | | | |
| Use Droplist | ☑ | Droplist Items | Sony; Panasonic; Shar |

(Use semicolons to separate items)

FIG. 12

| | |
|---|---|
| »Type Name | TABLE AND CHAIR SE |
| »Type Code | 12531 |
| Type Description | Set with Components |
| » Item Type Unit of Measure Type | Quantity |
| » Default Item Type Unit of Measure | each |
| » Usage | ○ Purchased<br>◉ Non-Purchased |
| Source | Project |

FIG. 13

| | | | | | Per Item Type | | | Include in Item Cost |
|---|---|---|---|---|---|---|---|---|
| Select | Number | Name | UOM | Min. | Max | Pct. Waste | Abs. Waste | |

Step 3 of 4: (Optional)Describe Components of the Item Type

Code: 12531  Name: TABLE AND CHAIR SETS
Description: Set with Components  Discipline(s): I - Interiors
Classification: 12500 - Furniture  Source: Project

| Select | Number | Name | UOM | Min. | Max | Pct. Waste | Abs. Waste | Include in Item Cost |
|---|---|---|---|---|---|---|---|---|
| ☐ | 12511 | TABLES | each | 1 | 10 | 0.0 | 0.0 | ☑ |

CAD Intelligence Mark Definition  [None ▼]

For Bids, RFQs, or Purchase Orders, default the quantity to
 ○ ((Quantity Drawn * Virtual Area Multiplier) + Quantity of Components) - Quantity Purchased
 ○ Quantity Specified - Quantity Purchased
 ⦿ Maximum of Above Quantities

Default Component Cost Behavior
 ⦿ Associated
 ○ Roll-Up

Default Waste Factor (per virtual area) [0.0] %

Default Absolute Waste (per virtual area) [0.0]

FIG. 15

Item Spec Wizard

Fields marked with(») must be entered.

Step 1 of 10: (Required) Enter General Properties for the Item

| General Properties |
|---|
| Attributes |
| Components |
| Vendor Notes |
| User Notes |
| Costs |
| History |
| Preferences |
| Report View |
| Attachments |

- Item Number: The Project-001-008
- Revision: 0
- » Name: Office Guest Chair
- Item Type: Seating
- Classification: 12500 - Furniture
- Discipline:
  - ○ A - Architectural
  - ⦿ I - Interiors
- Item Access: Property
- Item Description: Guest Chair in Office 201
- Status: Work In Progress
- Unit of Measure Type: Quantity
- [Import from Catalog]
- Unit of Measure: each
- Usage: Purchased
- Estimated Base Cost: 480.00  US dollars
- Budget Code: 001-100-00  [Find]

[Save]  [Close]  [Next]

Item Spec Wizard

Step 2 of 10: (Optional) Describe Attributes of the Item

| | | | |
|---|---|---|---|
| General Properties | | | |
| Attributes | Number | The Project-001-008 | Revision 0 |
| Components | Name | Office Guest Chair | Item Type Seating |
| Vendor Notes | Status | Work In Progress | Discipline I - Interiors |
| User Notes | Classification | 12500 - Furniture | |
| Costs | | | |
| History | | | |
| Preferences | | | |
| Report View | | | |
| Attachments | | | |

Attribute Categories
- Custom
  - Group/Collection: Berks Office Furniture
  - Seat Type: S-Data
  - Stretcher Type: Black Poly
  - Wood Type:
  - Metal Type:
  - Color/Finish: Black
  - Options:
- General
  - CSI MasterFormat: 12520
  - CSI Uniformat:
  - Height: 17 - 21    inches
  - Width: 20    inches
  - Depth: 20    inches
  - Arm Height: 4 range    inches
  - Seat Height: 25    inches
  - Seat Width: 20W - 20D    inches
- Vendor

[ Previous ]  [ Save ]  [ Close ]  [ Next ]

Item Spec Wizard

Step 4 of 10: (Optional) Enter Vendor Notes for the Item

| | | | |
|---|---|---|---|
| Number | The Project-001-008 | Revision | 0 |
| Name | Office Guest Chair | Item Type | Seating |
| Status | Work In Progress | Discipline | I - Interiors |
| Classification | 12500 - Furniture | | |

Sidebar:
- General Properties
- Attributes
- Components
- Vendor Notes
- User Notes
- Costs
- History
- Preferences
- Report View
- Attachments

Vendor Notes:

[ B  *I*  U  ≡  ≔  Reset  Find ]

This item specification is a performance spec and may be substituted for a similar item with the attributes and components specified.

Richly-formatted data will not print properly on PDF-formatted reports.

[ Previous ] [ Save ] [ Close ] [ Next ]

Item Spec Wizard

Step 6 of 10: (Optional) Enter Costs for the Item

| | | | |
|---|---|---|---|
| Number | The Project-001-008 | Revision | 0 |
| Name | Office Guest Chair | Item Type | Seating |
| Status | Work In Progress | Discipline | I - Interiors |
| Classification | 12500 - Furniture | | |

Office Guest Chair Costs by Virtual Area  [Rollup Cost]

1260-1

Estimated Unit Cost     480.00 US dollars     Unit of Measure: each
Included Component Cost     115.14 US dollars
Total Estimated Cost     595.14 US dollars

| Del | B Code | Virtual Area Path | Multiplier | Drawn | Components | Calculated | Specified | Estimate |
|---|---|---|---|---|---|---|---|---|
| ☐ | | \The Property\Floor 1\Room | 1 | 1.0 | 0.0 | 1.0 | 0.0 | 0.00 |
| | | TOTALS | | 1.0 | 0.0 | 1.0 | 0.0 | 0.00 |

[Add] (1260-2)    [Delete] (1260-3)    [Transfer to Budget] (1260-4)

Estimated Total Cost for Item

| Component No. | Name | Qty per Item | Est. Cost/Component | Pct. Waste | Abs. Waste | Extended Cost | Included |
|---|---|---|---|---|---|---|---|
| The Project-001-002 | Chair Fabric | 1 each | $4.00 | 1.0 | 0.0 | $4.00 | Y |
| The Project-001-007 | Fabricut Tenor | 2 each | $55.00 | 1.0 | 0.0 | $110.00 | Y |

Component Subtotal    $114.00
Estimated Unit Cost    $480.00
Estimated Total Cost    $594.00

Sidebar: General Properties | Attributes | Components | Vendor Notes | User Notes | Costs | History | Preferences | Report View | Attachments

[Previous] [Save] [Close] [Next]

FIG. 18H

Virtual Area — 1262

| Name | Specified Qty |
|---|---|
| The Property | |
| The Property/Floor 1 | 1.0 |

[Save]  [Close]

FIG. 18I

Item Spec Wizard — 1270

Step 7 of 10: (Optional) View History of the Item

Sidebar:
- General Properties
- Attributes
- Components
- Vendor Notes
- User Notes
- Costs
- History
- Preferences
- Report View
- Attachments

| Number | The Project-001-008 | Revision | 0 |
|---|---|---|---|
| Name | Office Guest Chair | Item Type | Seating |
| Status | Work In Progress | Discipline | I - Interiors |
| Classification | 12500 - Furniture | | |

☐ Show quantity legend

The quantities listed are as of the time of publication.
For current quantities please use the Item Spec List

| Revision | Publish Date/Time | Published By | Status | UOM | M | D | C | S | B | PP | P | Sh | R |
|---|---|---|---|---|---|---|---|---|---|---|---|---|---|

[Previous]  [Close]  [Next]

FIG. 18J

Item Spec Wizard

1274

Step 8 of 10: (Optional) Select Preferences for the Item

| General Properties |
| Attributes |
| Components |
| Vendor Notes |
| User Notes |
| Costs |
| History |
| Preferences |
| Report View |
| Attachments |

Number The Project-001-008    Revision 0
Name Office Guest Chair    Item Type Seating
Status Work In Progress    Discipline I - Interiors
Classification 12500 - Furniture For Bids, RFQs, or Purchase Orders, default the quantity to
  ● Quantity Drawn * Virtual Area Multiplier - Quantity Purchased
  ○ Quantity Specified - Quantity Purchased Waste Factor (per virtual area)    10.0 %
Absolute Waste (per virtual area)    0.0 (each)

[ Previous ]   [ Save ]   [ Close ]   [ Next ]

FIG. 18K

Item Spec Wizard

Step 9 of 10: (Optional) Report View of the Item

| | | | |
|---|---|---|---|
| Number | The Project-001-008 | Revision | 0 |
| Name | Office Guest Chair | Item Type | Seating |
| Status | Work In Progress | Discipline | I - Interiors |
| Classification | 12500 - Furniture | | |

Sidebar:
- General Properties
- Attributes
- Components
- Vendor Notes
- User Notes
- Costs
- History
- Preferences
- Report View
- Attachments

---

Next    Last    Page [1] of 3    PDF    Refresh

The Company    Item Number: The Project-001-008
123 Main Street    Item Name: Office Guest Chair
Anytown, NV 00000
Phone: 999-995-5999
Fax:

| Project Name: | Project Number: | Property: | Specifier: |
|---|---|---|---|
| The Project | 001 | The Property<br>NV 00000 | User One<br>user@company.com |

Manufacturer:    Berk's Office Furniture    Vendor:
9631 Reseda Blvd.
Northridge, CA 91324

| | | |
|---|---|---|
| Phone: | (818) 993-5657 | Phone: |
| Fax: | | Fax: |
| Primary Contact: | | Primary Contact: |
| Phone: | | Phone: |
| Email: | | Email: |
| Secondary Contact: | | Secondary Contact: |
| Phone: | | Phone: |
| Email: | | Email: |

| Item Description: | Requirement Type: Performance Spec |
|---|---|
| Guest Chair in Office 201 | Allow Equal Vendors: Yes |
| | Vendor Lead Time: 6 hours |
| | To Be Bid: Yes |

Manufacturer Catalog:    Manufacturer Item Number:    Manufacturer Description:

[Previous]    [Close]    [Next]

FIG. 18L

Item Spec Wizard

Fields marked with (») must be entered.

Step 10 of 10: (Optional) Add Attachments for the item

| General Properties |
|---|
| Attributes |
| Components |
| Vendor Notes |
| User Notes |
| Costs |
| History |
| Preferences |
| Report View |
| Attachments |

Number The Project-001-008  Revision 0
Name Office Guest Chair  Item Type Seating
Status Work In Progress  Discipline I - Interiors
Classification 12500 - Furniture Images (.jpg, .gif, or .bmp)  ☑ Show Images  [Find] [Upload]

| Select | # | Name | Image |
|---|---|---|---|
| ☐ | 1 | fabric image.jpg | |
| ☐ | 2 | chair image.jpg | |

[Delete]

Documents  [Find] [Upload]

| Select | # | Name |
|---|---|---|
| ☐ | 1 | specification document.doc |

[Delete]

[Previous] [Close]

Item Schedule Template

Specification Publish Wizard

ITEM SPECIFICATION OBJECT MANAGEMENT SYSTEM

CLAIM OF PRIORITY

This application claims the benefit of U.S. Provisional Application Ser. No. 60/244,492, entitled "Intelligent CAD Objects Technology", filed Oct. 30, 2000.

This application also claims the benefit of U.S. Provisional Application Ser. No. 60/246,275, entitled "Intelligent CAD Objects", filed Nov. 6, 2000.

This application claims the benefit of U.S. Provisional Application Ser. No. 60/244,457, entitled "Item Data Integration System And Method", filed Oct. 30, 2000.

This application also claims the benefit of U.S. Provisional Application Ser. No. 60/246,276, entitled "Item Data Integration System And Method", filed Nov. 6, 2000.

This application claims the benefit of U.S. Provisional Application Ser. No. 60/244,493, entitled "Tracking Modules For Specified Objects", filed Oct. 30, 2000.

This application claims the benefit of U.S. Provisional Application Ser. No. 60/244,485, entitled "Module For Publishing Reports On Intelligent Object", filed Oct. 30, 2000.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

CROSS-REFERENCE TO RELATED APPLICATIONS

This application relates to application Ser. No. 09/557,641 filed on Apr. 25, 2000, entitled "Agent Based Purchasing System" and naming Thomas A. Wucherer as inventor, the application being incorporated herein by reference in its entirety.

This application relates to application Ser. No. 09/519,935 filed on Mar. 7, 2000, entitled "Integrated Business System for the Design, Execution and Management of Projects" and naming Cherisse M. Nicastro, Thomas A. Wucherer, Todd Nisbet and Anthony A. Marnell II as inventors, the application being incorporated herein by reference in its entirety.

This application relates to U.S. patent application Ser. No. 10/021,661 filed on Oct. 30, 2001, entitled "Intelligent Object Builder" and naming Thomas A. Wucherer, Cherisse M. Nicastro, Anthony A. Marnell II and Anthony A. Marnell III as inventors, the application being incorporated herein by reference in its entirety.

The present application is related to U.S. patent application Ser. No. 10/020,552 filed on Oct. 30, 2001, entitled "Business Asset Management System", and naming Cherisse M. Nicastro, Thomas A. Wucherer, Todd Nisbet, Anthony A. Marnell II, Anthony A. Marnell III, and Herman Spencer, Jr., which patent application is incorporated by reference herein in its entirety.

This application relates to U.S. patent application Ser. No. 10/016,615 filed on Oct. 30, 2001, entitled "Business Asset Management System Using Virtual Areas" and naming Cherisse M. Nicastro, Thomas A. Wucherer, Todd Nisbet, Anthony A. Marnell II, Anthony A. Marnell III, and Herman Spencer Jr. as inventors, the application being incorporated herein by reference in its entirety.

BACKGROUND OF THE INVENTION

1. Field of the Invention

The present invention relates to integrating business management functions, and more particularly to an item data management system for use in the design and build industry to manage the lifecycles of items used in a project.

2. Description of the Related Art

Designing and building an asset is a complicated and long process that requires the diverse services of many participants. These project participants may include architects, structural engineers, mechanical engineers, electrical engineers, interior designers, etc. (often referred to as disciplines) who are responsible for creating the design plans for the project. The project participants may include a purchasing agent or purchasing department that is responsible for purchasing items (e.g., furniture, fixtures and equipment, etc.) for integration into the project, as well as other individuals and entities, including but not limited to vendors and material manufacturers who provide items required to complete the project. Contractors and subcontractors actually build the project according to the design plans, which may include architectural drawings. Expeditors track and route purchased items to the site when needed by contractors and subcontractors. The project participants may further include accountants who are responsible for tracking the project's fiscal budget and paying for items purchased. A project manager may manage the participants, approving some or all changes to the project requested by the participants. Additionally, the project owner may participate to ensure that the project meets his or her requirements from initial conception through completion.

A project typically involves many phases including design and build. These phases often overlap and each is highly dynamic. The design phase usually starts with one or more designers creating conceptual drawings of the project according to a developer's direction. The drawings generally include perimeter lines representing specific areas (e.g., restaurants, rooms, lobbies, offices, etc.) within the project. The drawings may also include graphical representations of items within the specified areas. For example, an architect may create a drawing of a restaurant area of a hotel/casino project. The restaurant drawing may include graphical representations of furniture, fixtures, and equipment (FF&E) such as tables, windows, ovens, refrigerators, a backup power generator, etc.

The initial drawings, once completed, are provided to several other project participants involved in the design and build process. For example, the restaurant drawing example above may be provided to one or more structural engineers, mechanical engineers, electrical engineers and interior designers for their review, modification, and/or supplementation. These project participants may add further graphical representations of items to the initial set of drawings. An interior designer of the project may wish to add graphical representations of additional items such as chairs or art work to a dining room sub-area of the example restaurant drawing above. A structural engineer may also seek to add graphical representations of items to the restaurant drawing such as a platform on which the backup power generator (graphically represented in the drawing) rests.

When project participants (e.g., engineers, interior designers, etc.) receive initial drawings of the project, the drawings give very little information about the items graphically represented. Typically, the drawings simply identify the items by title or type (e.g., "a table," "a window," "a backup power generator"). The engineers, interior designers, and other project participants further define or specify the characteristics or attributes of items originally contained in the drawings or items added to the drawings.

The engineers or designers sometimes annotate specification information on the drawings, but often the engineer or designer creates a separate specification for each item graphically represented on the drawing. For example, an interior designer may create a separate specification for each type of chair graphically represented in the restaurant drawing. Each item specification contains descriptive information (such as size, material and finish, etc.) regarding a type of chair, and may reference other specifications such as fabric. Likewise, an electrical engineer may, for example, create a separate specification for the graphically represented backup power generator describing, for example, the generator's size, power generation capacity, weight, and other attributes.

In addition to providing specifications for items contained on drawings, there are times when drawings are not created or items are not contained on a drawing which is created, but there are still specifications for items required. For instance, in the above restaurant example is remodeled, specifications for new furnishings may be created without a drawing. Alternately the designer may provide an item schedule which list many like items and their distinguishing characteristics or referenced items.

FIG. 1 includes an example of a specification for an item to be included as part of a project. An interior designer developed this specification for an entertainment center to be included in the living room of a suite of a hotel project. Portion 110 of the specification includes general information about the specification, such as a specification number, and the area and project into which the item will be incorporated. Portion 120 includes manufacturer information, distributor information, a description of the item, the dimensions of the item, manufacturer catalog information and the manufacturer catalog description. Portion 130 describes the quantity of the item to be ordered, price information, and budget information for the item. Portion 140 indicates information about receiving a sample of the item, and portion 150 includes information about the finish for the item. Portion 150 also includes notes about the finish, notes about the interior dimensions, and a note that the specification was issued to the purchasing department on May 26, 1998. Portion 160 includes an image of the entertainment center. Portion 170 shows information about other specifications providing information about the entertainment center. Not all portions 110 through 160 are included as part of every specification, and specifications may have portions describing other information not shown.

Other item specifications may contain different data or sections of information. For instance, Portion 120 may list the color, weave, repeat, and pattern for a fabric. The details required are identified by the type of item (e.g., hard furniture, upholstered furniture, fabric, oven, sink, faucet, chiller, etc.) Each of these types will have different characteristics or attributes to be described to differentiate like items. The type of item also may require references to other specifications required for an assembly. For example, furniture may reference fabric and paint while chillers may reference piping and pumps. Attributes and required references must be defined in templates for each type of item specification.

Engineers and designers normally employ software applications for generating specifications for project items for which they have responsibility. These software applications generate electronic versions of specifications into which engineers or interior designers enter descriptive information. Engineers or designers usually enter a reference to a graphical representation in a drawing into the appropriate each specification so that the specification can be associated with an item represented on the drawing. The electronic specifications may be organized as flat files, templates, spreadsheets, or word-processing documents.

Once the engineers or designers finish writing a an item's specification, the specification is ready to be provided or "published" to other project participants for review, modification, supplementation, and/or approval. The engineer or designer can send the specification as e-mail attachments if the recipient has a computer system with appropriate software applications for accessing the attachments. Alternatively, copies of the specification may be printed and distributed. The author saves one copy as the original specification in electronic version form, hard copy form, or both, for archiving purposes. Except for the graphical reference in the specification, specifications are forwarded to other project participants disassociated from their corresponding drawings.

One or more revisions to item specifications may occur throughout the process. Indeed, revisions to an item specification can occur even after the corresponding item is purchased. In this latter case, the purchased item would normally be located and returned to its manufacturer, and the purchase price may be refunded, in whole or in part.

Specification revisions may occur for a variety of reasons by a variety of project participants. For example, the project owner, upon receipt of a specification for one of the restaurant chairs, may desire the chair color to be different than originally specified or determine that the chair as originally specified is too expensive. Another interior designer for the project, upon receipt of the same specification for the restaurant chair, may notice that the originally specified fabric did not include fire treatment in accordance with local fire codes. The structural engineer, upon receipt of the specification for the backup power generator, may notice that his platform may not support the weight of the backup generator specified by the electrical engineer. Each reason for revision is communicated to the original author who, in response, revises the specification accordingly. Once revised, the specification is re-distributed to other project participants for further review, modification, supplementation, and/or approval. The author of the original specification has the responsibility for maintaining a history of all revisions to the specification. The author also has the responsibility to ensure that all necessary project participants have the most recent version of the specification.

Once a specification for an item has been approved by all the necessary project participants, it may be submitted to the project's purchasing agent. The purchasing agent, in turn, may create a purchase order for the item using information from the specification. An example of a purchase order for several items, including the entertainment center of FIG. 1, is shown in FIG. 2. Page 1 of the purchase order shows the entertainment center of FIG. 1 as item 1, page 2 shows orders for other items 2-5, and page 3 shows general notes for the purchase order.

The purchasing agent, like the project engineers and interior designers, may employ a computer system executing specialized software for generating a purchase order. Typically, the purchasing agent manually transfers specification information into the purchase order, as shown in FIG. 2. The purchasing agent subsequently sends the purchase order to manufacturers via hard copy or e-mail attachment. The purchasing agent also sends a copy of the purchase order to the project's accountant.

Coordinating communication of information regarding items in a construction project becomes more complex as the scale of the project increases. Collaboration and the exchange of information, including drawings and item specifications, between design and build participants also increase the complexity of each project. Effective and efficient collaboration is often the single most important key to bringing a project to fruition in a quality, timely and cost effective manner. However, as more fully exemplified above, collaboration and information exchange between participants, is typically a paper-based and chaotic process. Furthermore, it is difficult to determine the history of an item based upon the papers residing at different project participants.

Managing change throughout the life cycle is also difficult in a paper-based or disparate application-based process. Decisions are not always based on all information available, for instance, an owner may choose not change the color of a fabric if the owner had known that the fabric had already been purchased and that a restocking fee would apply.

What is needed is an item data management system that will integrate data throughout the item's lifecycle. Data from the separate applications should be presented as an integrated whole to users of the item data management system. An item data management system that is capable of providing budgeting, design specification, CAD drawings, purchasing, bid processing, receiving, invoicing, location, and maintenance data, or other processes in the item's lifecycle, about an item is desirable.

Integrated data allows change management throughout the process. For example, designers may wish to be notified if they are deleting an item from a drawing that has already been purchased; Specifiers may wish to be notified if they are exceeding the approved budget for an item; Purchasing Agents may wait to purchase items if they know there is a revision in progress; Maintenance personnel may want to know when preventative maintenance is required or a warrantee for an item is expired; etc. The rules for managing these changes and notifications should be configured by project participants.

SUMMARY OF THE INVENTION

The invention, roughly described, comprises a method for constructing and managing data concerning items of an asset. In one aspect, the method comprises: providing a user data entry interface; receiving a plurality of data values, each into a data field of the interface, wherein the plurality of data fields comprise a specification for the item and each data field of the specification describes an attribute of the item, and storing the specification into a database on a computer system.

In a further aspect, the invention comprises a data structure stored in a data store. The data structure includes a plurality of data values comprising an item specification provided in a plurality of data fields describing an item. The data fields may include at least one attribute value, at least one component value; and at least one allocation value.

In a further aspect, the attribute is one of a group consisting of the following: a physical attribute of the item; and a functional attribute of the item.

In still a further aspect the system tracks an item specification's references and required quantities of other specifications required for an assembly.

In an additional aspect, the system regulates the project participants who can perform an action (e.g., view, modify, revise, publish) by the items status and discipline.

In an additional aspect, they system allows project participants to link areas of the project to the item specification.

In another aspect, the system routes an item for approval and publishing the item to project participants.

In a supplementary aspect, the system tracks the history of changes to an item specification.

In yet another aspect, the system provides change management to project participants notifying them when specific actions occur as defined by user set business rules.

In yet another aspect, the step of providing occurs on a first computer and said step of storing occurs on a second computer. The computers can be coupled by a network, which in one embodiment is the Internet.

In another aspect, the data interface comprises a template creation tool, a specification creation tool, and a specification management tool.

In a further embodiment, the invention is a method of allowing users to manage an asset. The method includes the steps of providing an application server coupled to a network; providing, responsive to a client request, an item specification management toolset including at least one template definition application; and receiving data from the client and storing it in a database.

In still another embodiment, the invention is a system for defining and managing an asset. The system includes a data store for item specification data provided on a host computer coupled to a network; and a data input toolset comprising at least an item type manager and an item specification manager.

In another aspect, the system may include an item specification publisher and an item specification schedule builder. The data store may be provided on the host computer and the data input toolset is provided to a second, client computer. In another aspect the host computer is coupled to the Internet and the data input toolset is provided to a client computer via the Internet.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 shows an example of an item specification to be included as part of a project.

FIG. 8 is a depiction of how one embodiment of an item specification manager appears.

FIG. 12 is a depiction of a screen for entering attributes.

FIG. 13 is a depiction of a screen for entering components.

FIG. 14 is a depiction of a second screen for entering component information.

FIG. 15 is a depiction of a screen for entering preference information and the type of information which may be added at this step in a definition process.

FIGS. 18A-18M are depictions of the process screens in the flowchart of FIG. 17.

DETAILED DESCRIPTION

Figure 2:
FIG. 2 shows an example of a purchase order for an item to be included as part of a project.
Figure 2:
Figure 2:

The creation of Item Specifications for use in an Intelligent Business Management System described in co-pending U.S. patent application Ser. No. 10/020,552 entitled BUSINESS ASSET MANAGEMENT SYSTEM (TRIRG-01000US0) by Cherisse M. Nicastro, Thomas A. Wucherer, W. Todd Nisbet, Anthony A. Marnell II, Anthony A. Marnell III, and Herman Spencer, Jr. (hereby fully incorporated by reference herein). Specifications are used throughout the life of a project from design, through procurement, execution, and asset tracking. Almost all users of the system shown in the co-pending application will have access to Specifications in some capacity. CAD users can associate Specifications to drawing objects; a purchasing agent scan access the uploaded counts from CAD to determine how many are required and the Project Manager can monitor progress and the budget.

The system described in co-pending U.S. patent application Ser. No. 10/020,552 entitled BUSINESS ASSET MANAGEMENT SYSTEM (TRIRG-01000US0) by Cherisse M. Nicastro, Thomas A. Wucherer, W. Todd Nisbet, Anthony A. Marnell II, Anthony A. Marnell III, and Herman Spencer, Jr. (previously incorporated by reference herein) is a design build and management system which incorporates asset data into specifications for use in its system. It includes two data input means: one defined in co-pending U.S. patent application Ser. No. 10/021,661 entitled INTELLIGENT OBJECT BUILDER (TRIRG-08851US0) by Thomas A. Wucherer, W. Todd Nisbet, Anthony A. Marnell II, and Anthony A. Marnell III (hereby fully incorporated by reference herein) and the Item Specification Tool set described herein.

The Item Specification Tool set is an independent application for creating intelligent objects without using a CAD system.

The following terms will be used throughout the specification and are defined as follows:

Attribute: A quality of characteristic inherent in or ascribed to an item specification.

CAD: Acronym for "Computer-aided design." Computer-aided design software is used by architects, engineers, drafters, artists and others to create precision drawings or technical illustrations. CAD software can be used to create two-dimensional (2-D) drawings or three-dimensional (3-D) models.

Classification: The system of the present invention recognizes classifications as a category or class of item types . The classification tree displays the classes in a hierarchal fashion.

Company: An organization or group that performs services or provides products within the system. A business enterprise; a firm. Individual company defaults and standards revolve around a company.

Company Administrator: The first user for any company. This user is responsible for setting up licensing, company information, company defaults, users, vendors, and so forth.

Component: The system supports components as a part of an Item Specification. A component is an existing Item Specification associated to another item specification; together, they make up a whole item or an assembly. An Item Specification can have multiple components.

Document Set: A special type of folder in the Collaboration tool. A document set allows a user to group together any number of files into a common set. The actual files are stored in separate folders organized in whatever manner suits the user. The contents of the document set folder are merely shortcuts, or pointers, to the actual files. Only one copy of any given file needs to be maintained.

Item Specification: The detail information about objects involved in building the parts and components of something. An example of an item would be a desk; an example of the item specification would be the description of the desk (height, width, depth, color, material, and so forth), its manufacturer(s), costs, delivery options, catalog numbers, and so forth.

Item Type: A template for creating item specifications for broad categories of items. For example: a user might have an item type of "office furniture," this item type forms a template a user would use to create the many item specifications for various desks required.

Project: A plan or proposal; a scheme or undertaking requiring concerted effort. The system of the present invention allows any plan with more than one task to be considered as a project.

Property: The base organizational point for the activities of a Company within the present system. The property is the larges hierarchal space in one or more virtual areas. The "Property" label may be customized using the Nomenclature options in Company Defaults.

Qualification: The Qualification process is the act of ensuring that a company is suitable to perform work or provide materials for a specific project. The system provides the ability to qualify vendors and/or services before bidding and purchasing. Qualification is an information gathering process that can be used for screening purposes.

Schedule: A schedule is a list of specified items, a reference number, a version number and the item status information. The system provides the ability to generate schedules, either by type or instance, for the entire project or specific virtual areas.

Figure 3:
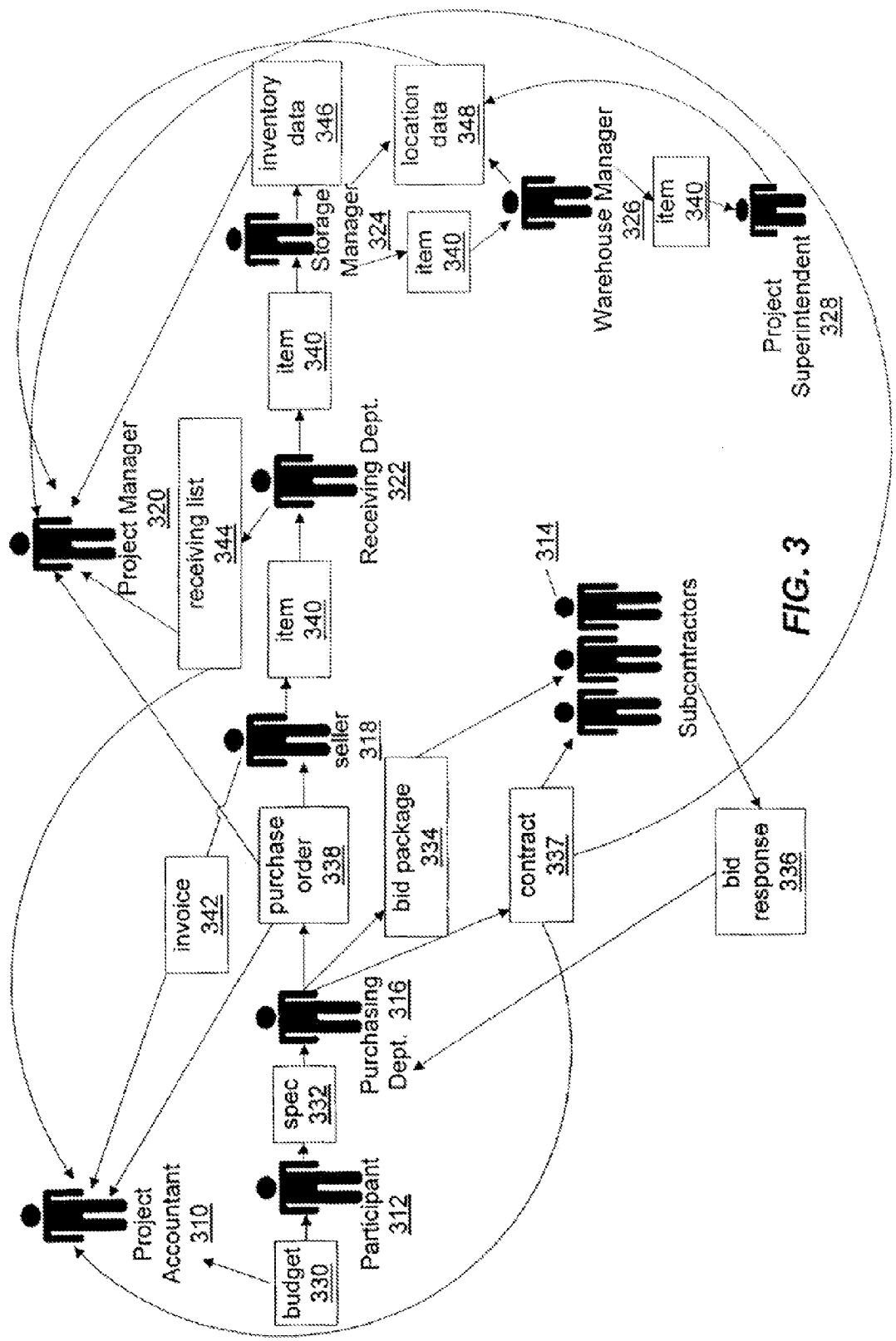
FIG. 3 shows one example workflow for an item through the item's lifecycle.

The foregoing terminology is used herein for convenience in understanding the present invention. It should be understood that the aforementioned definitions are not intended as limiting the scope of the present invention to the particular terms which are defined. Other nomenclature may be used to represent the concepts and substance of the foregoing definitions. In understanding the tool set of the present invention, it is helpful to understand data flow in a project. FIG. 3 shows an example data flow for an item through several stages of an item's lifecycle. A project participant 312 originally provides a budget 330 for the project. From the budget 330, different project participants produce specifications such as specification 332 for items to be purchased. The purchasing department 316 optionally may produce a bid package 334 from the specification to obtain bids for an item to be purchased. Subcontractors and vendors, among others, such as subcontractor 314, submit bid responses such as bid response 336 to the purchasing department 316. Purchasing department 316 decides to which subcontractor or vendor a contract 337 or purchase order to provide the item should be awarded. Contract 337 is communicated to project accountant 310 and project manager 320. Each of project account 310 and project manager 320 may use respective computer system(s) (not shown) for managing different types of data associated with an item.

Upon awarding contract 337 or directly upon receiving specification 332, purchasing department 316 may produce a purchase order 338 or contract for ordering the item from a seller 318. Vendor 318 sends the item 340 to the receiving department 322 and an invoice 342 to project accountant 310. Receiving department 322 sends a receiving list 344 to project accountant 310 and project manager 320. Receiving department 322 also places item 340 in storage. Storage manager 324 optionally sends item 340 to a warehouse and provides location data 348 to the project manager 320. From the warehouse, warehouse manager 326 distributes item 340 to the construction site and provides location data 348 to the project manager 320. Location data 348 regarding the current location of item 324 is provided by warehouse manager 326 to project manager 320. Alternatively, storage manager 324 may send item 340 directly to the construction site and provide current location data 348 to project manager 320. Project superintendent 328 then places the item in the appropriate location within the project.

The stages of the lifecycle depicted in FIG. 3 include only those stages through the delivery of the item to the site and payment for the item. An item has a life beyond the stages depicted; for example, after being delivered to the site, the item is placed into a location within the project and often used for many years. The scope of the invention includes managing these stages of the lifecycle of the item. The stages shown in FIG. 3 are one example and used for illustration purposes only.

As shown in FIG. 3, many types of data flow to many project participants during the lifecycle of an item used in a project. The term "item data" is used herein to describe collectively these many types of data associated with the lifecycle of the item. Each of the project participants may use one or more application programs to track the different types of item data that he or she receives and/or generates. Often project participants use application programs that are not used by other project participants, so that data is sent via paper from one project participant to another. In such a paper-based system, each project participant manually enters the data into one or more respective application programs.

Item data are described herein as objects of an object-oriented framework, although the scope of the invention includes other organizations of item data. For those unfamiliar with object-oriented frameworks, a brief summary is presented here. The building block of an object-oriented framework is an object. An object is defined through its state and behavior. The state of an object is set forth via attributes of the object, which are included as data fields in the object. The behavior of the object is set forth by methods of the object. Each object is an instance of a class, which provides a template for the object. A class defines zero or more data fields to store attributes of an object and zero or more methods.

Each data field contains attribute information defining a portion of the state of an object. Objects that are instances of the same class have the same data fields, but the particular attribute values contained within the data fields may vary from object to object. Each data field can contain information that is direct, such as an integer value, or indirect, such as a reference or pointer to another object.

Figure 4:
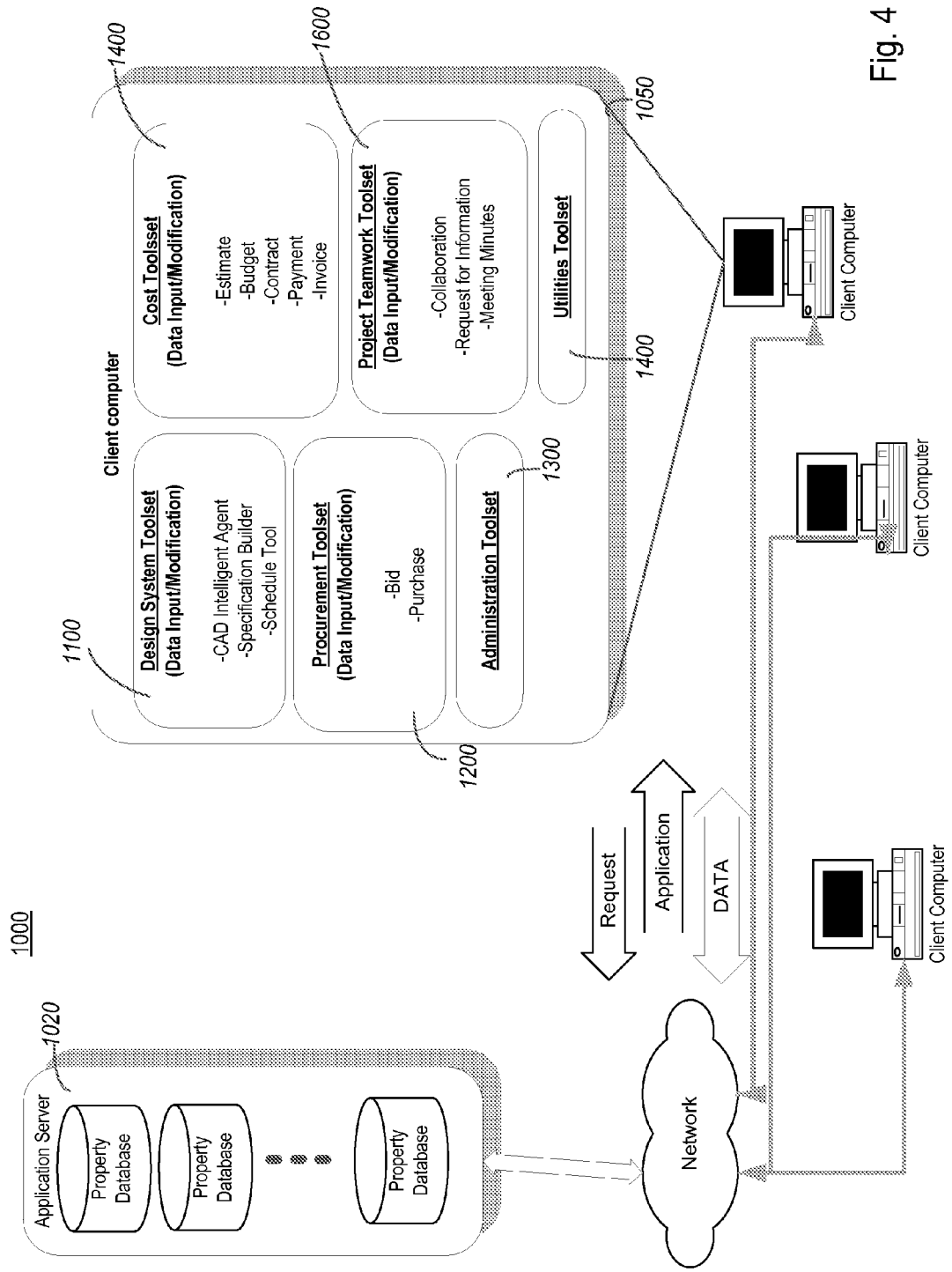
FIG. 4 shows a block diagram of an item data management system.

FIG. 4 is an overview of the system described in co-pending U.S. patent application Ser. No. 10/020,552 in which the tool set of the present invention may be used. It should be understood, however, that the tool set presented herein has applications outside that of its use in building electronic specifications for use with collaborative tools and in electronic commerce transactions.

As shown in FIG. 4, the system includes an application server providing application toolsets to one or more client computers. The server and computers are coupled by a network, which may be a public network, a private network, or a combination of public and private networks such as the Internet. The toolsets are designed to facilitate the project creation and management by manipulating data describing basic elements of the project stored in at least one database on the application server or a separate database server. FIG. 4 shows the six general types of application toolsets accessible by a client device. Four types of applications support project data entry and modification, while two support system management and utilities. The specific functions of each of these groups of applications are set forth below.

Each client device may comprise a personal computer, a thin client or any other type of processing device capable of supporting applications described herein, and the system may be accessed by different types of client devices—such devices need not be personal computers but do need to support the applications provided in the applications toolsets. Applications server 1020 also includes at last one database for property item data managed by the system of the present invention. In FIG. 4, the databases are organized by property, but such organization is exemplary and not meant as limiting on the system of the present invention. Organization of the databases into one or more other data structures or classifications is contemplated as being within the scope of the present invention.

The application toolsets provided in the system include: a Design Toolset 1100, a Cost Management Toolset, a Project Teamwork Toolset and a Procurement Toolset.

The Design Toolset allows users of the system to coordinate data input into the system 1000. As noted above, data input tools include a CAD Intelligence plug-in agent, the Specification Builder presented herein, and a schedule tool. The Procurement Toolset 1200 includes a Bid/RFQ tool, a Purchase tool, a expediting tool, a shipment notification tool and a receiving tool. The Cost Management Toolset 1400 provides an Estimates tool, Budgeting tool, a Contracting tool, a Payment tool, and an Invoicing tool. Finally, a Project Teamwork Toolset 1600 includes Collaboration Tool, a Request for Information tool and Meeting Minutes tool. Two other sets of applications are provided—an administration tool set 1400 and a utilities tool set 1400.

The system described therein is provided in the context of its implementation in an Application Service Provider (ASP) model. In this context, the ASP model includes providing applications from an application server including databases organized by project or property to a client computer. In this context, an ASP is used to refer to an application server providing applications to a client device, as opposed to those applications which are installed in non-volatile memory on the client device. In one embodiment, the application toolsets may be implemented as a set of applications configured to run in another interpretive application, such as in Internet Browser.

The application server 1020 is a server program in a computer in a distributed network that provides the business logic for an application program run on the client computer 1050. The application server 1020 may comprise a portion of the system which may further include a graphical user interface (GUI) server, an application (business logic) server, and a database and transaction server. In one embodiment, the application server combines or works with a Web (Hypertext Transfer Protocol) server and is called a Web application server. The Web server provides several different ways to forward a request to an application server and to forward back a modified or new Web page to the user. These approaches include, but are not limited to, the Common Gateway Interface (CGI), FastCGI, Microsoft's Active Server Page, and the Java Server Page. In some cases, the Web application servers also support request "brokering" interfaces such as CORBA Internet Inter-ORB Protocol (IIOP) and Enterprise Java Beans.

In general, a request, such as an HTTP request, from the client device is made to the application server via the network. If the request is for a particular application, the application will be transmitted to the client, loaded and run by the client by presenting a graphical input/output page to a user.

The system is configured to have a "Home Page" and one or many "Project Page(s)" for each user. Representations of exemplary pages are shown in FIGS. 4B and 4C. The project page may be customized to provide any number of the tools, or a subset of the available tools, to the user depending on the level of access granted to the user by the Company Administrator. The project page will contain links to the applications which are accessible to the user, including the Specification Toolset or "Item Specification" Publisher, Type Manager, Manager Schedule Builder and Schedule Reporter, and the data supplying those applications and the applications themselves are provided by the applications server. In addition, security level access to the data is controlled by the application server.

In general, data is created in the database by the design toolset applications. Data is stored in the system in the form of "intelligent objects". When actions (budgeting, purchasing, delivering, maintenance scheduling) occur to that object, by any system user, the "intelligence" of the object is updated with this information. An example of the data which may be used in the system of the present invention is set forth in co-pending U.S. patent application Ser. No. 10/021,661.

The data may be stored in a database in any of a number of object, relational or distributed database structures. In one embodiment, the data is organized in a series of name value pairs and relationship tables accessible via XML or SQL. In another embodiment, the data is provided in a relational database with each object represented by a single row of generic columns of attribute data, along with an attribute definition row. In yet another embodiment, the data is organized into object classes and subclasses in an object database.

Specification Tools

In one example of the present invention, a series of specification tools as provided includes an Item Type Manager, an Item Specification Manager, and Item Specification Wizard, a Specification Publisher and a Schedule Reporter. Item Specifications are defined as database entries that describe an individual object in the project. Any object that can have its own part number (or UPC code) can have its own Specification Number. Specifications can also be assembled from other component items. Item Specifications can also be linked to virtual areas. A virtual area is defined as a spatial representation or work breakdown of an asset which may contain other virtual areas. It should be understood that the specific tools described herein comprise one implementation of the invention and this implementation may be varied within the scope and spirit of the claims without departing from the invention.

Item Types, as shown in FIG. 8, is a term for templates. An Item Type is a way for users to determine which data fields will be required to define the Spec. Item Types are templates for creating item specifications for broad categories of items. The use of Item Types enables one to display all the item types for a selected classification. The system recognizes classifications as an organizational mechanism category or class for item types. The classification tree displays the organization in a hierarchal fashion. Disciplines are used as a category or class of trades, and are used to organize item types and control access. This function allows one to open and display all details of a selected item type. The Item Specification Manager also allows one to copy the attributes of a selected item type to create a new item type with the ability to edit the existing attributes. This process also provides the ability to delete an existing item type that has not yet been used to define an item specification. One may create a new item type for a selected classification by accessing the Item Type Wizard.

Throughout the system as described in U.S. patent application Ser. No. 10/020,552, permissions are granted to all users based on their required duties. To work with Specs, several different permissions can be granted. Permissions include the ability to create, publish, revise, list, etc.

The Item Type Wizard defines the general properties of the item type, including the type of attributes and components that will need to be specified in the item specification. Attributes are characteristics of the item type that are necessary to define the item specification. Components link item(s) required for the assembly or completion of a particular item specification. The system supports components as a part of an item specification. A component is an existing item specification associated to another item specification that makes up a whole item.

For example, a door may require hardware, such as hinges, for completion. The hinge item type is a component of the door item type. Existing item types can be located through a search feature and added as components. This tool allows the user to create rules for the item type that define how a waste factor is calculated for the item, which CAD mark is associated with the item type, whether component cost should be calculated as an associated cost or rolled up into the cost of the original item, and so forth. The preferences defined apply to all item specifications that are created with this item type.

Figure 5:
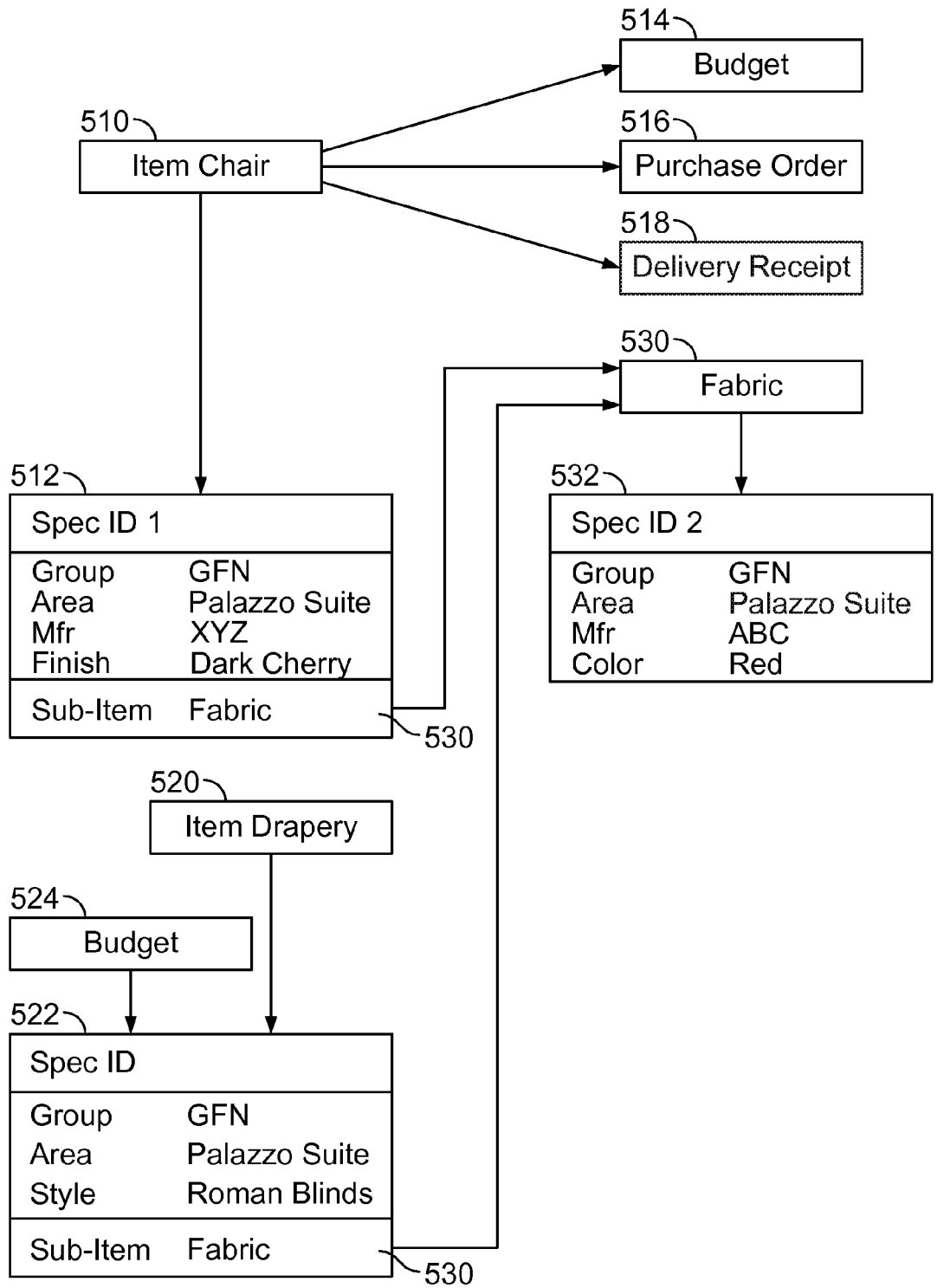
FIG. 5 shows an example of a specification as a configurable data object.

FIG. 5 shows an example of the item specification as a configurable data object. Three items are shown, including a chair 510, a drapery 520 and a fabric 530. Specifications 512, 522 and 532 are associated with the three items. Fabric 530 is a sub-item of chair 510 and has its own specification 532. The drapery is made from the same fabric as the chair and fabric 530 is also a sub-item of drapery 520. All of these items are specified as part of the guest room furnishings group for the Palazzo Suites area of the project.

While each of the specifications 512, 522 and 532 provides a specification for an item, each has different attributes. For example, the specification object 512 for chair 510 has a finish attribute, which in the example shown has a value of "dark cherry." In contrast, specification object 522 for drapery 520 has a style attribute with a value of "Roman blinds" and specification object 532 for fabric 530 has a color attribute with a value of "red." The ability of different specifications to have different attributes provides great flexibility to a user of the item data management system 400. Standard specifications can be defined when information is to be tracked for many items of a particular type, but a new specification can be defined whenever additional information is needed for an item.

Figure 6:
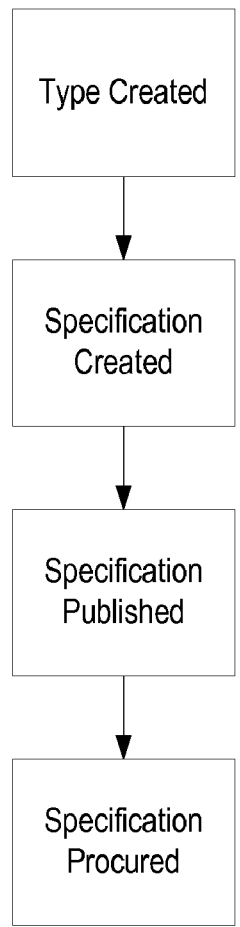
FIG. 6 is a flow diagram illustrating the life cycle of an item specification.

FIG. 6 shows a simplified representation of the life of an item specification. In general an item type is created, a Specification is then created from the item type, the Specification is published and the Specification can be procured. Additional detail on the use of specifications can be found in co-pending U.S. patent application Ser. No. 10/020,552.

Figure 7:
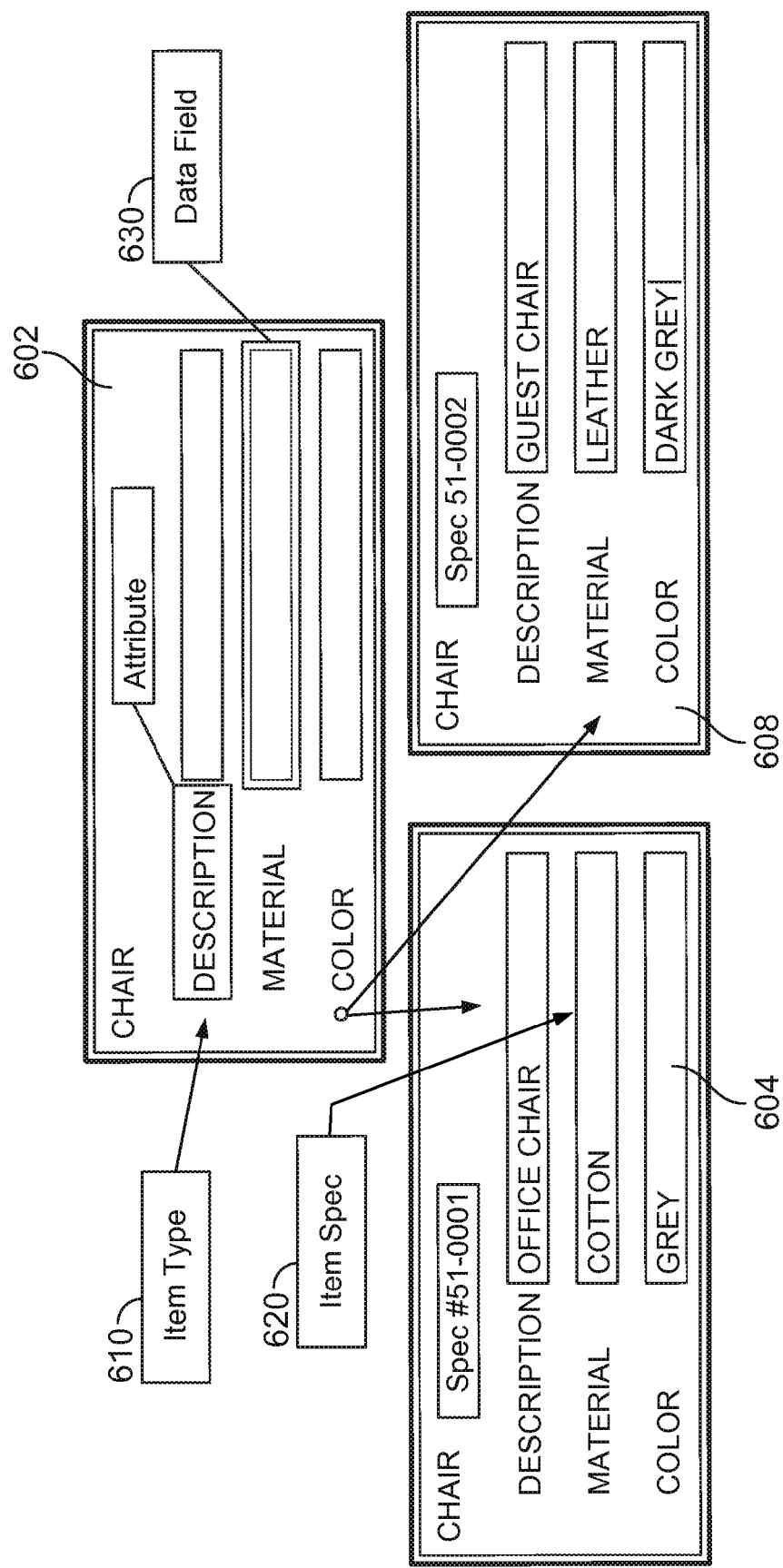
FIG. 7 is an illustration of the relationship between item templates and item specifications.

FIG. 7 shows the relationship between item types and Specs. Shown in FIG. 7 is a basic example of a specification. From the one Item Type, two Item Specifications were created. You can create an unlimited number of Specifications from an unlimited number of Item Types. This is done by creating new Specifications and entering different data in the Data Fields.

A Specification 604 is created from an existing Item Type template 602. Once the Specification 604 is created, it is automatically saved with a unique Specification number. When a Specification is considered complete and final, it is then published. Publication is a pre-requisite for use with the procurement tools of co-pending U.S. patent application Ser. No. 10/020,552. Publication also records a copy of the item specification in its history log. As discussed below, if components are required to define part of the Specification, they can be created beforehand or added later. Once a Specification is created in a project, it may be exported to the company level so that it may be used in other properties and projects. Hence, Specifications can have a parent and child relationship.

To create an Item type, one must first access the item type manager, shown in FIG. 8. To create an item type, one must be logged in to a project and have the correct permissions assigned to the role of the user. Many classifications, such as Architectural related classifications, will have default Item Types that are ready for use.

The manager screen is divided into different areas. The upper left area 810 displays the project's Classification Tree. This is a directory that will define how the Item Types (and Specs) are organized. The tree is similar to folders used in Microsoft Windows. Users can select folders to expand or collapse items in the tree. When one can no longer expand the tree, the lowest level is the classification entry. If there are custom Item Types listed under this classification, it will be displayed in the frame on the right 820.

FIG. 8 shows an Item Type for the classification for Furniture (12500) and pick on the text "12500—Furniture". Shown at 820 is a list of seven default Item Types that have been created for Furniture. The column Type Info indicates that these are all Default Item Types (Type Info='D'). It should be noted that default item types are not required. For example, a company may be setup with custom classifications and therefore not have any default Item Types. If this is the case, users need to set up custom types.

Figure 9:
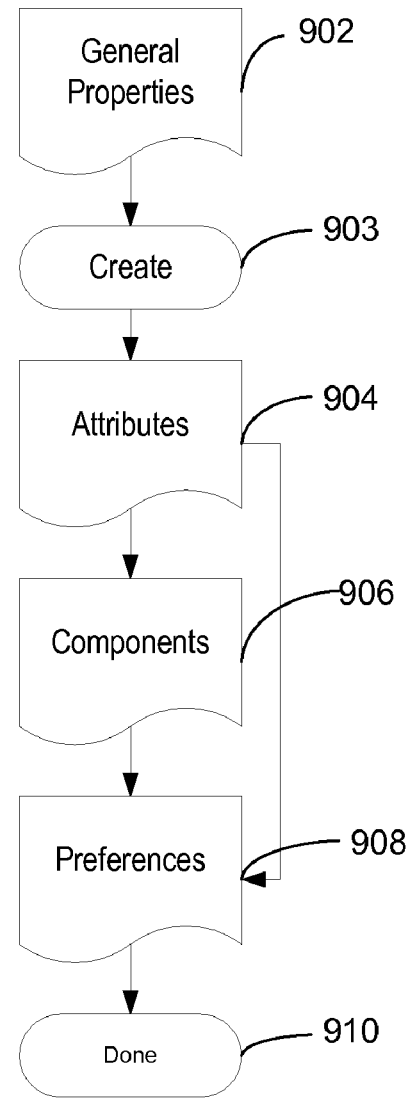
FIG. 9 is a flow diagram of how Item templates are defined.
Figure 10:
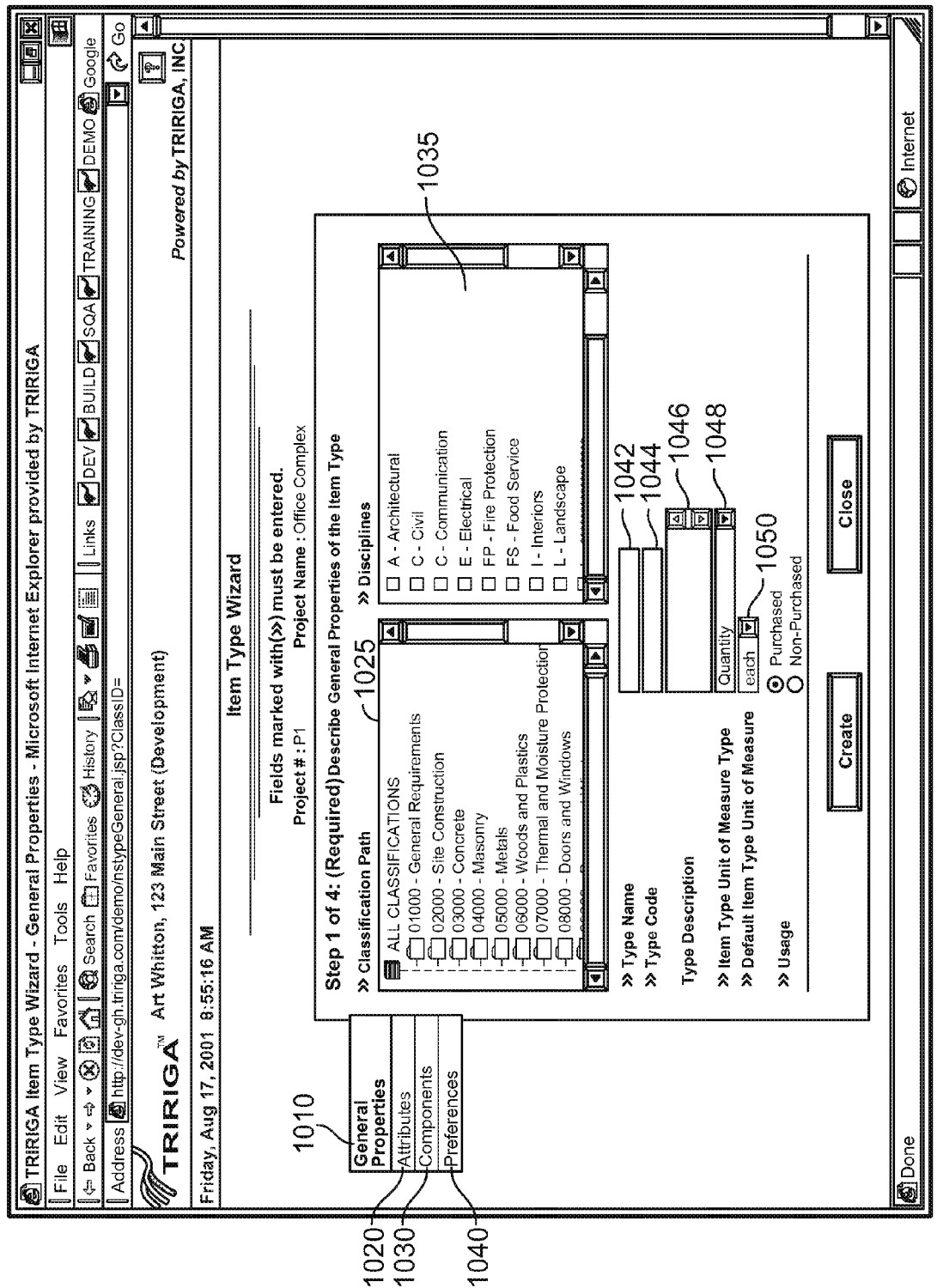
FIG. 10 is a depiction of how the general properties page of one embodiment of an Item type wizard appears to a user.

Selecting to view an Item Type will open the Item Type Wizard, shown in FIGS. 9 and 10. FIG. 9 is a flow chart showing the creation of an item type using the Type Wizard. Shown in FIG. 10 is an example of the Item Type Wizard page presented to a user. It includes four tabs on the left side of the window which roughly correspond to the steps shown in FIG. 9. Each Tab opens a new page in which user input is required or optional in setting up a new Item Type. To create a new Item Type, a user selects the "New" button at the bottom of the screen to open the Item Type Manager.

At step 902, the user selects the "General Properties page" and fulfills three sub-steps to create an item type. First the user selects a classification by navigating through the project's classification tree 1025 to find the most suitable classification for the Item Type one is creating.

Disciplines are then assigned using the right hand side of the screen at 1035. A discipline is a broad area of operation with a project. Disciplines (such as Plumbing, Electrical, Architectural, and so forth) are used in later processes to categorize files, item types, item specifications, and to grant or restrict access to information. Disciplines can be reused to group item specifications. Users can be assigned permission to a role to perform tasks within specific disciplines.

Finally, data is entered into the lower portion of the screen in FIG. 10. The Name field 1042 is required and allows one to identify the name of the new item type. This name will appear every time this item type is referenced. The Type Code 1044 field allows one to define the code that will be used to identify this item type. Type Description field 1046 is a brief description or several key words that can be used for searching this item type. The Item Type Unit of Measure field 1048 specifies the measure that will be used for this item type from the available options in the drop-down list. All of the item specifications that use this item type will inherit this unit of measure type. The Default Item Type Unit of Measure 1050 automatically defaults to the corresponding units of measure that relate to the Unit of Measure Type chosen. Finally, the usage selector determines whether this item type will be purchased. Selection of "Purchased" may trigger creation of a number of pre-defined attributes relating to the Manufacturer and Vendor.

Next, one moves to the attribute definition step at 904. Attributes are the data fields that allow one to define how the Item Type will describe the Spec. In the television example, one attribute will be "Brand".

Figure 11:
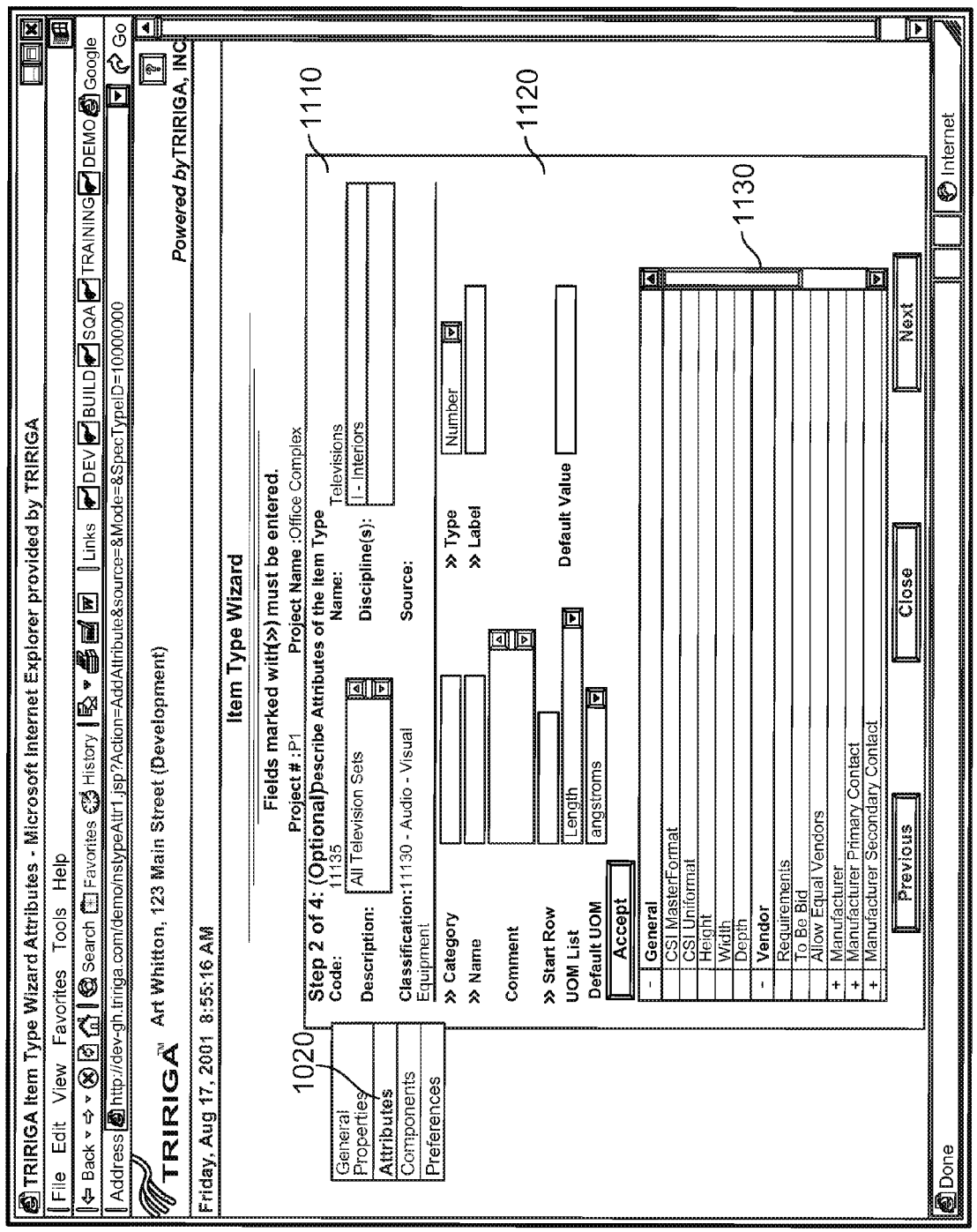
FIG. 11 is a depiction of how the attributes page of one embodiment of an item type wizard appears to a user.

An exemplary attribute definition screen is shown in FIG. 11. This screen is divided into three areas: the existing data from the previous page at 1110, the attribute definition area 1120 and the existing attribute list at 1130.

In one embodiment, the system may include a number of predefined attributes. In FIG. 11, these attributes are divided into two exemplary categories: General and Vendor. Companies may choose to work with one of a number of the industry standard codes available from any number of agencies, including the Construction Specifications Institute (CSI) Masterformat codes and in one embodiment, the default classification tree may be based on these codes. FIG. 12 shows how a first attribute—a brand attribute—is added. The Category field requires one to define a new category or enter an existing one for the attributes. The categories display as rows that contain the attribute fields. The Type field requires one to select the type of attribute to be defined. Available types are: Number, Text, Data Date, Duration, and Currency. A selection in this field changes the amount and type of attribute characteristics. The name field requires one to indicate the name of the attribute. This name displays as the field name when working with the Item Type. The Label field is the label that the user will see as name of the field for the attribute value. This will generally be the same as the Name field, with the exception being when data is the Type. The Comment field allows one to include any applicable comments about this attribute. The Start Row field requires one to identify the placement of the field to contain this attribute. The Row Span field requires one to identify the number of the rows that should appear in the attribute field for data entry (this field defaults to 1).

The Default Value field allows one to define the default value which will display in the Item Specification attribute field as the Unit of Measure List. This field allows one to select an applicable unit of measure type for this attribute. This information may differ from the unit of measure type previously selected for the Item Type. The Default Unit of Measure field allows one to define a default unit of measure for this attribute. This Unit of Measure will display as the default when defining this attribute for an item Specification. The Drop List items allow users to specify items to appear as a drop-down list. If left blank, the field will display as a standard text entry field. This field allows one to type the options that should appear in the list.

Additional Data Attributes linking the attributes to the system database discussed in co-pending U.S. patent application Ser. No. 10/020,552, if required, may also be provided. In one embodiment, a Type Field option allows one to link the attributes to the database if required. These choices will populate the attribute with "sub-attributes". Examples of such attributes are: Vendor which allows one to search through a company's vendor list to select a company on record having sub-attributes such as address, city, state, zip, etc.

Once the attributes are defined, if the item type uses components, one proceeds to the component definition process at 906. If the item type does not use components, one proceeds directly to the assignment of preferences.

FIGS. 13 and 14 show exemplary screens for adding components to the item type definition. Components are existing Item Specifications associated to another item specification; together, they make up a whole item. An Item Specification can have multiple components.

In FIGS. 13 and 14 a new component "Table and Chair Set" is created from components Tables" and "Chairs", which are themselves existing item types. FIG. 13 shows a page on defining the information for the item type "Tables and Chairs", while the components are added at FIG. 14. (In FIG. 14, only the "Tables" component is shown.) A search function allows users to reveal every item type associated with the current product. Data is entered into the fields shown in FIG. 13. Fields specified in FIGS. 13 and 14 have the same input data definitions as those shown and described above.

At the preferences step 908, the user is prompted to enter additional information characterizing how the Type will be used in the system of co-pending U.S. patent application Ser. No. 10/020,552. An exemplary preferences page is shown at FIG. 15, showing the preferences that may be set by a user. The CAD Intelligence Mark Definition field allows one to select from a list of mark definitions that have been uploaded from the CAD Intelligence plug-in, described as an Intelligent Object Builder in co-pending U.S. patent application Ser. No. 10/021,661 to associate to this item type. If there are no mark definitions in the system this field displays "None" as the only option.

The Bids, RFQs, or Purchase Orders field allows one to indicate how the default quantity will be calculated for this Item Specification. This is the default quantity that will be used for bids, request for quotes, and purchase orders. The Default Component Cost Behavior filed allows one to select whether the cost of the Item Specifications (should it be a component of another Spec), created with this item type, should be associated with the parent item Specification or not. The Default Waste Factor (per virtual area) field allows one to indicate percentage of estimated waste (based on quantity) that will be included in the quantity and cost calculations. The Default Absolute Waste (per virtual area) field allows one to identify a specific unit amount for each Virtual Area that this Specification will be associated with.

Additional functions which may be added to the item type include but are not limited to the following: definition of reporting preferences including the selection of layout per attribute and specification data type; definition of a purchasing agent's ability to modify the requirements of a specification; etc.

Item Specification Manager

Figure 16:
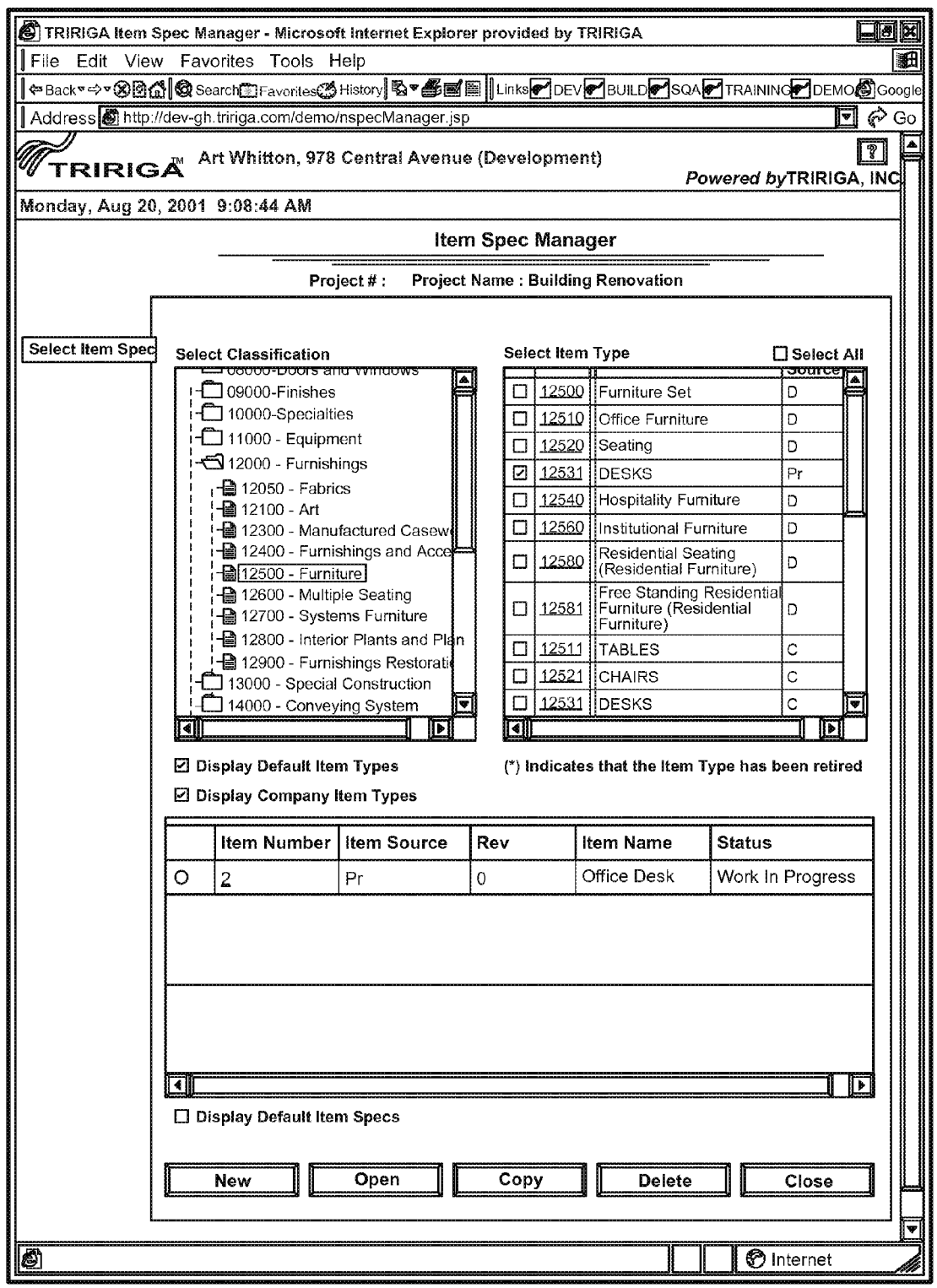
FIG. 16 is a depiction of a page for selecting specifications in an item specification management application.

The Item Specification Manager, shown in FIG. 16 enables one to display all the item specifications for a selected classification and item type. A general outline of the functions of the Item Specification Manager is shown in FIG. 16. This function allows one to open and display all details of a selected item specification. The manager also allows one to copy the attributes of a selected item specification to create a new item and provides the ability to edit the existing attributes. This process also provides the ability to delete an existing item specification that has not yet been published. One may create a new item specification for a selected classification by accessing the Item Specification Wizard. The Item Specification Wizard is explained below.

Item Specification Wizard

The Item Specification Wizard enables one to assign general properties to the item specification, such as: item specification number, name, physical classification, and item type. After one has created the item specification, one can define other general properties such as the base cost and budget code. One may also define which users for this property can view the item.

The Item Specification Wizard allows one to define specific attributes and associate available components relating to the item specification. Components link item(s) required for the assembly or completion of a particular item specification. This tool also enables one to provide a vendor with written notes about the item specification, such as delivery requirements, special instructions, vendor terms or any other information that needs to be communicated to the vendor. This feature also enables one to preview the item specification information and prepare a report for printing. This Item Specification Wizard also provides the ability to calculate the total estimated cost, including component items, automatically. Costs are used for budgeting, bidding, and purchasing items. A history of the item specification is tracked to allow users the capability to view the historical status and specification changes for the item specification and its components over time, or view previous versions of the item specification. Any information that was defined for this item Specification using the CAD Intelligence plug-in Interface described in co-pending U.S. patent application Ser. No. 10/021,661 or the Item Specification Tool displays in the Item Specification Wizard.

Figure 17:
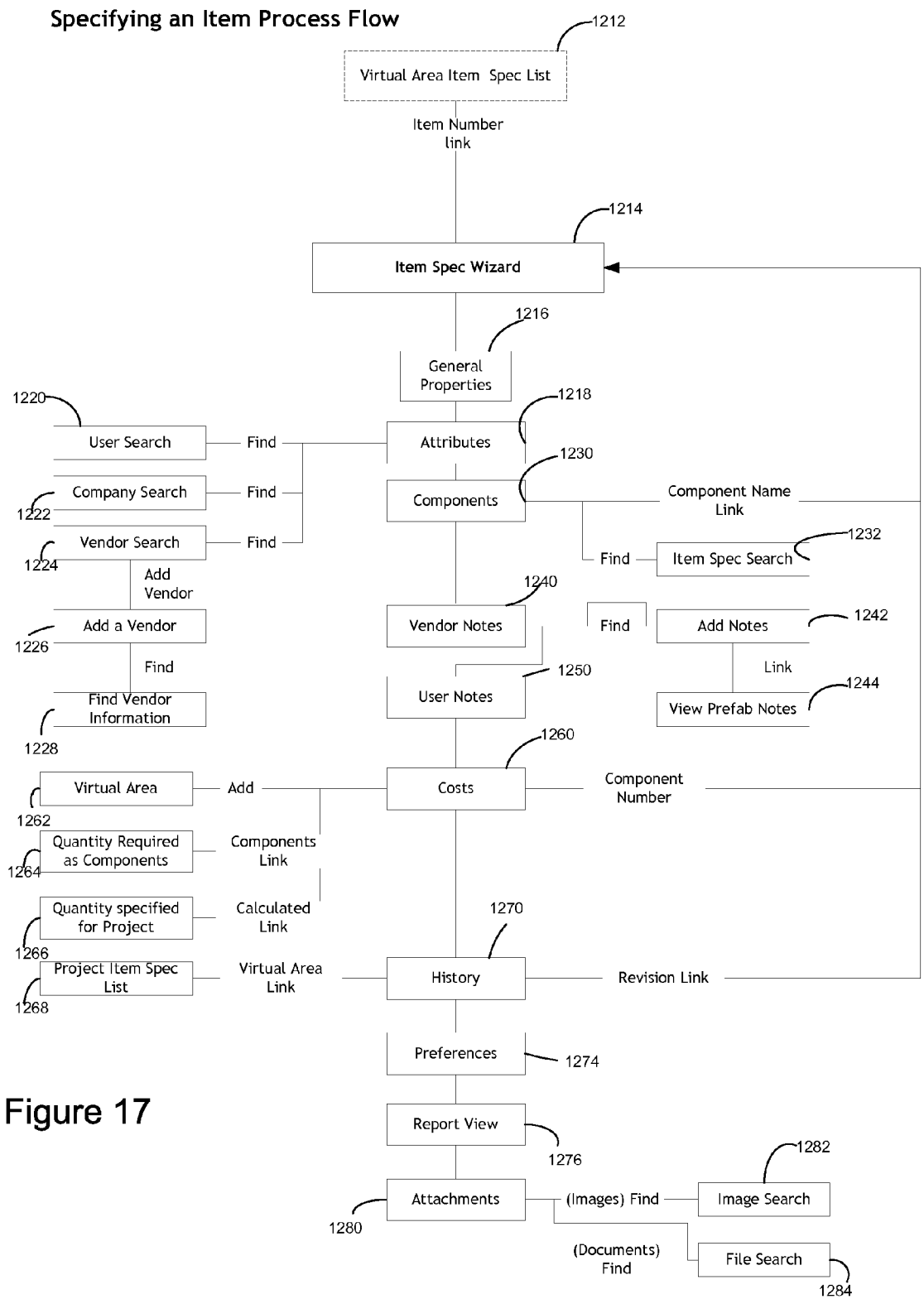
FIG. 17 is a flowchart representing a process for specifying an item flow.

The Item Specification Wizard process flow is shown in FIG. 17. The Item Specification Wizard contains a general information page 1716 which allows the drawn item Specification to be associated with an item in an online catalog created by the company and assigns this item to a budget code.

One option of the general properties page allows the user to assign a budget code to the item Specification to track the cost and status of the item Specification via a Budget Code Search page and search for the existing budget code for that item.

Figure 18C:
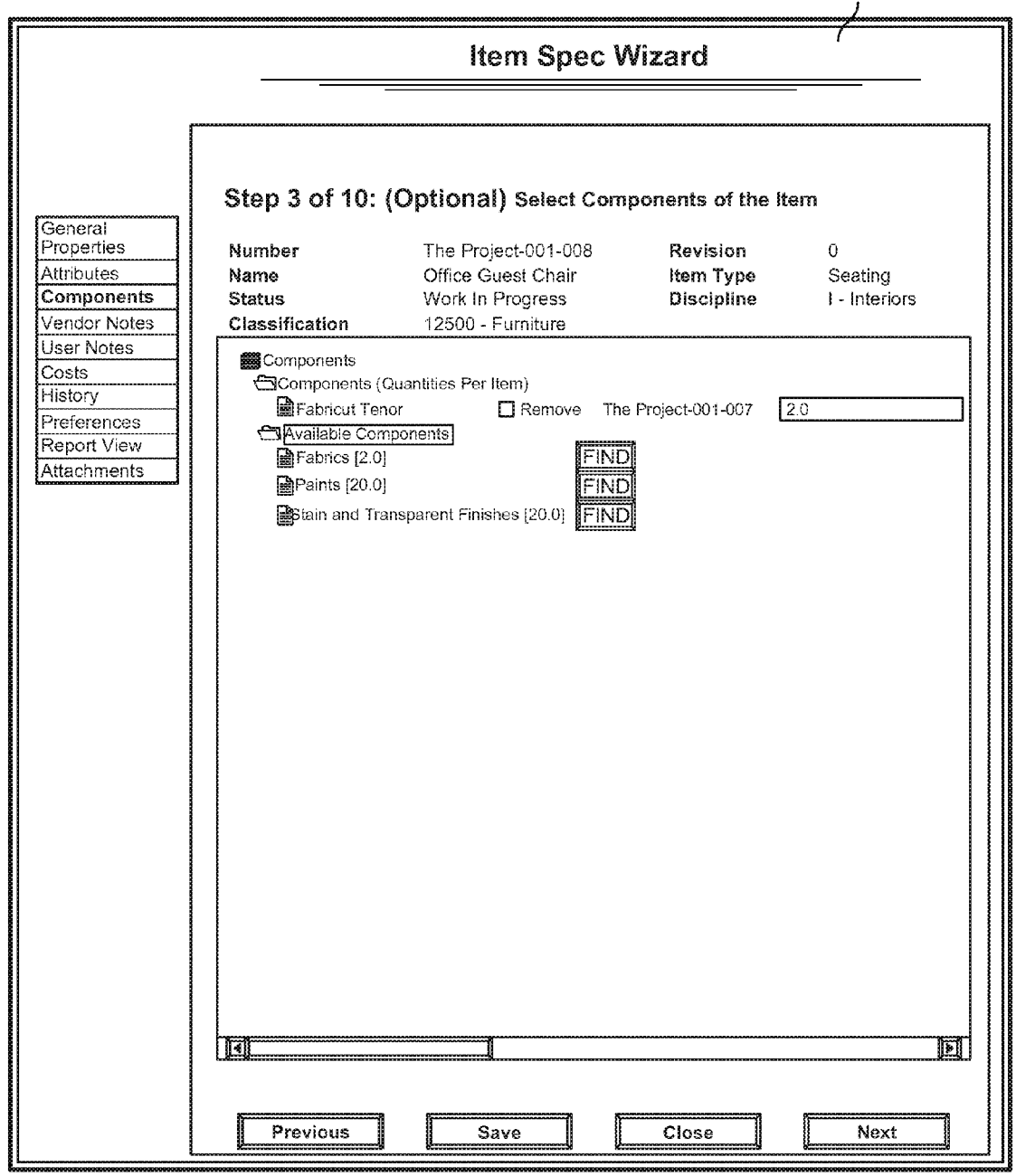

Once the system has returned the appropriate budget code it may be assigned to the item Specification by user action. This action returns the user to the Item Specification Wizard—General Properties page. An example of this page is shown in FIG. 18. Pages shown in FIGS. 18*a* through 18*o* generally correspond to each box in FIG. 17. Each page is designed to lead a user sequentially through the item set up process in the wizard. This sequence is presented in FIG. 17. The user then needs to navigate to the next step in the process, which is defining the item spec's attributes.

On attributes page 1218 (FIG. 18*b*) allows Attributes to be defined to specify an item. Attributes include color, size, shape, distributor, vendors, contacts, etc. Defining these attributes ensures the correct item Specification is bid, purchased and ordered for the project.

Searches for users 1220, companies 1222, and vendors 1224 may be used in entering attributes for the components. Vendors may be added 1226 at this stage as well, and vendor information for existing vendors retrieved for added vendors 1228.

Components 1230 (FIG. 18*c*) are child item Specifications and associated with a parent item spec. In this case, the component is the fabric for the office chair. The components may be associated with the item Specification in this process. Components must already exist in the system in order to associate them to an item spec. The user must also have the appropriate access to locate and view these item specs.

Because the drawing listed the fabric as a component this information displays on the Components page. This process allows you to add more than one component that may have been previously specified but not included on the drawing.

If the user determines another fabric component needs to be added to the chair, the Items Search page 1232 (FIG. 18*d*) is accessed to locate other components of fabric for selection.

Figure 18D:
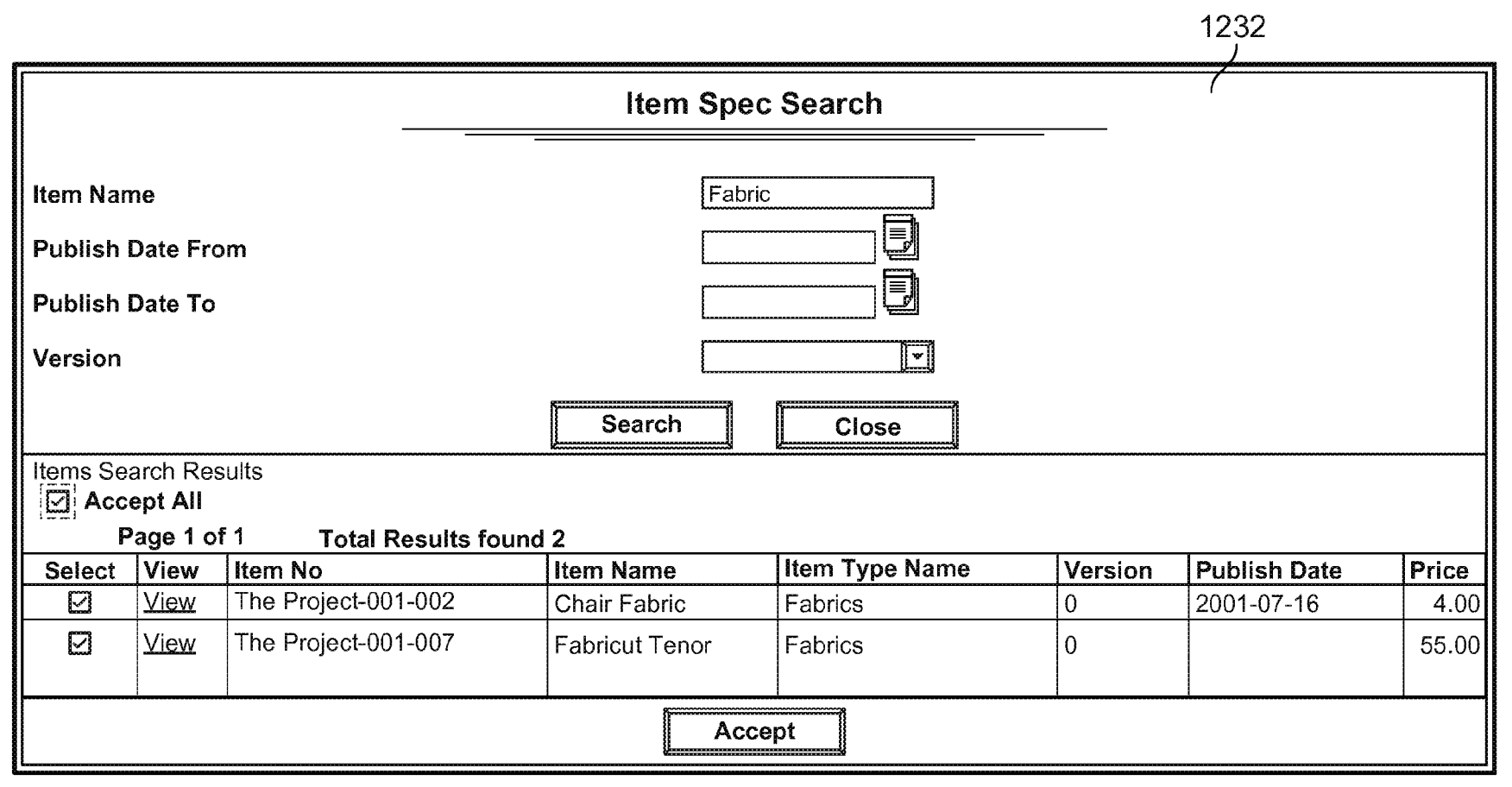
Figure 18E:
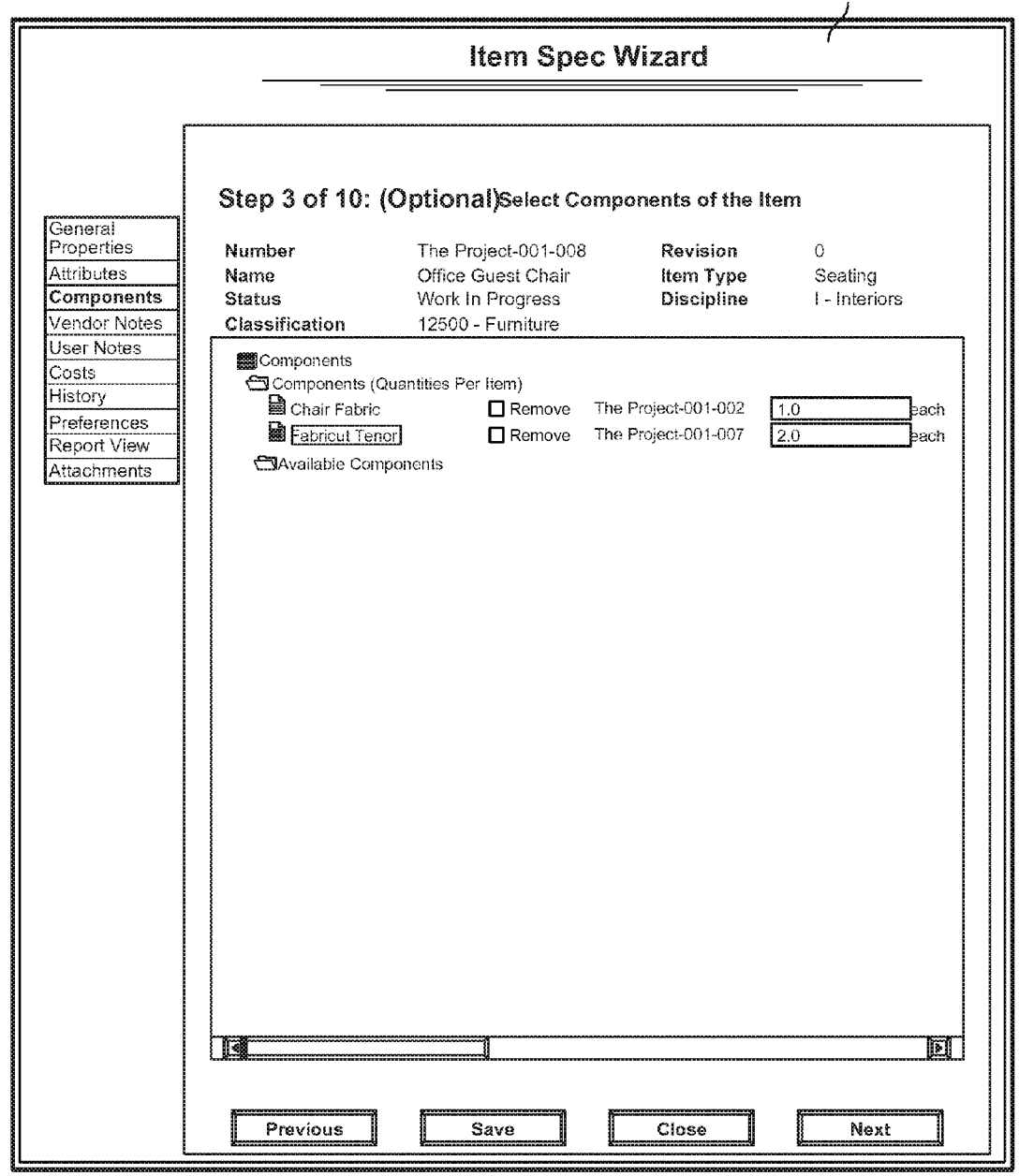
Figure 18G:
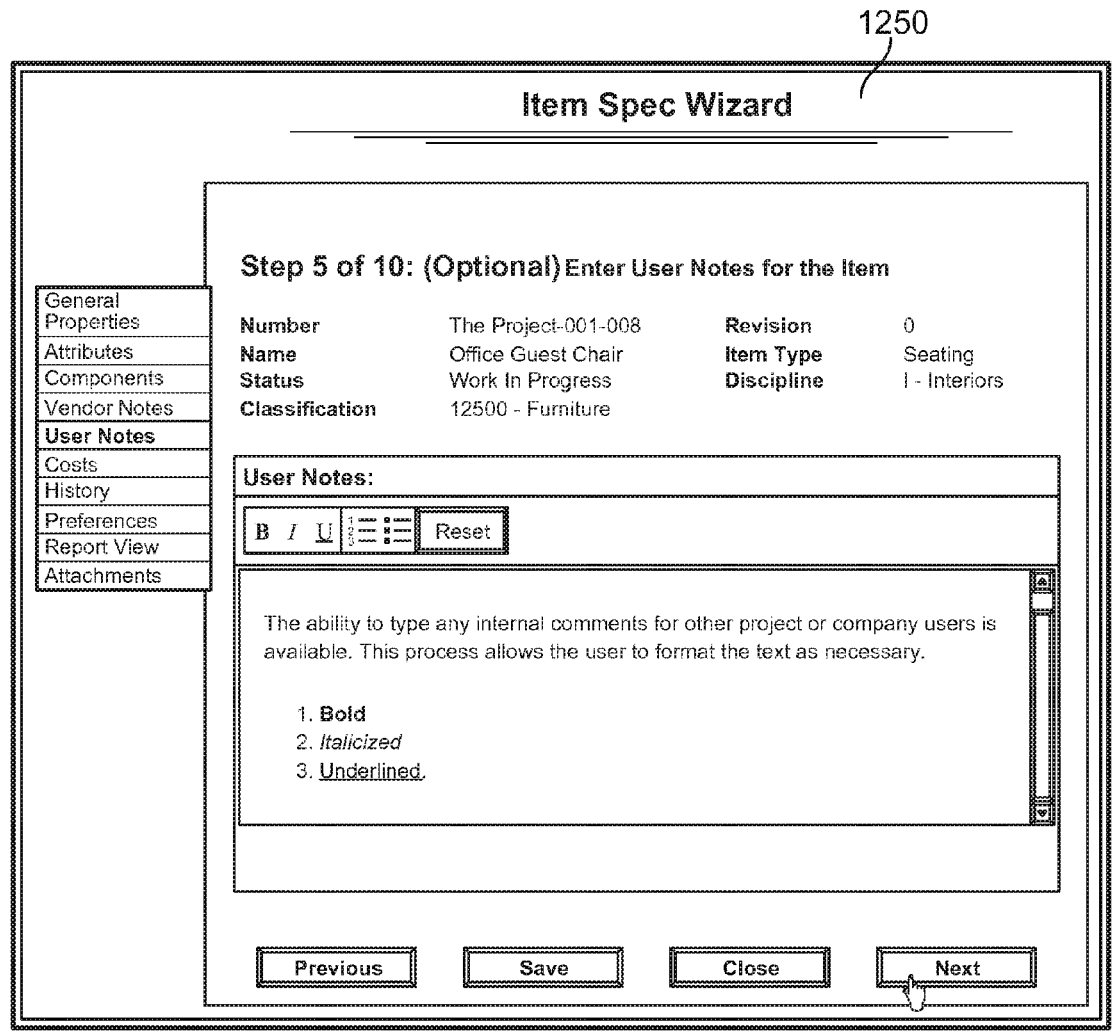

After the component(s) have been searched, selected and accepted the Item Specification Wizard displays the newly added component(s) and allows the user to edit, remove or save the information (FIG. 18*e*).

Next vendor notes 1240 (FIG. 18*f*) may be optionally added. These include any notes to the vendor(s) about the item specification. These are not required in order to specify the item, but are available as a matter of convenience.

The user may locate and select prefabricated notes for this process. The company creating the item Specification defines these notes in another process. The user may also type and format the notes to the vendor.

Next user notes 1250 (FIG. 18*g*) may be provided in order to accommodate and support internal processes for the company creating the item spec. The user may include internal notes that are not available to anyone without the designated permissions to access these notes.

The cost definition 1760 (FIG. 18*h*) is a required process of the system. The next required step is defining the virtual area association and the cost of the item. This information is required for RFQ (requesting quotes), Bids, and Purchase Orders. As shown therein, items may be added 1260-2, deleted 1260-3, and transferred 1260-4 to the project budget.

Once this information is defined, the system transfers, tracks, and calculates the appropriate cost of each item and its component(s). This process allows the user to choose whether to calculate the cost of the component as one rolled up cost 1260-1 or as a separate item.

For example, if the item Specification and the component are purchased as one item, such as the chair being sold with its component fabric already installed, then the component should be calculated as a rolled up cost. If the item and its component are purchased separately, such as when the fabric is not being installed on the chair by the vendor, then the item costs should be calculated as separate items although these costs are still associated as components of this chair.

Another available feature of this page is the association of the item Specification to the virtual area. The user may specify the quantity of item Specifications for each virtual area. The user may access the virtual area page (FIG. 18*i*) to specify the quantities for each area of the property or project.

If the quantity of this item Specification is increased or decreased, the system recalculates the costs and displays the appropriate amount.

Any calculated costs can then be transferred into the budget 1260-4 and calculated as pending cost or revenue. The Costs page also has a unique function allowing the user to view the details of each item Specification per virtual area as shown in FIG. 18A.

Additional functions which may be added to the item costs page include but are not limited to the following: definition billing data from the specifier to their customer; designed quantities for areas to be used in conjunction with the multiplier to assist in defining a specified quantity and cost for an area; etc.

Next, a user can display the history of the Item Specification at 1270 (FIG. 18*j*). The history in this example is non-existent because the item Specification has not yet been published. The history of an item Specification does not begin until its first publication. Until that time, any changes made to the item specification are considered "Work In Progress".

After the item Specification has been published, any changes then become an official revision and are tracked and available for display. This page will be revisited later in this document to show the history of an item Specification after the publication.

The next step in the Item Specification Wizard is defining preferences 1274 (FIG. 18*k*). Defining preferences allows users to determine the behavior of the item Specification and the method of calculations for future processes within the item Specification lifecycle. The preferences default to the calculation of the quantity of item Specifications specified in the system minus the quantity of item Specifications purchased. This provides the proper calculations of item specifications that do not include the quantity of item Specifications included within a drawing.

The user does have the option of specifying whether they would prefer the quantity of item Specifications calculated by the quantity displayed in the drawing multiplied by the designated virtual area multiplier (usually 1) minus the quantity of item Specifications purchased.

The other information that may be defined in this step of the process is the waste factor. The waste factor is the quantity of the item specification that should be included in the cost, quoting, bidding and purchasing processes due to a certain amount of loss that may occur during the assemble or installation of the item spec.

For example, if the user orders a chair with fabric as the component, the user may need to calculate a specific or percentage of that fabric will go to waste when assembling the chair. In this case it was calculated that 10% of this item specification will go to waste and should be calculated into the cost and quantity of the item spec.

The Specification Wizard also provides a report view 1276 (FIG. 18*l*). This page is a view of the item Specification report that summarizes all of the specifications defined for this item spec. This is available for the user to review before publishing or finishing the item spec.

Finally, an attachments process 1280 (FIG. 18*m*) allows the user to attach any images or documents to the item spec. These attachments are available for any user that accesses the item spec, such as through a Request for Quote (RFQ), bid, or purchase order.

This process allows you to either search the system for previously uploaded images and documents or to attach files from the user's local drive (personal computer or local network). This page also allows users to upload images or documents from their local drive to attach to the item specification. Once the files have been attached to the item spec, the specifying step is complete. The Item Specification List shows that the item Specification has not only been drawn but is also specified in the system.

Item Specification Schedule Builder

Figure 19:
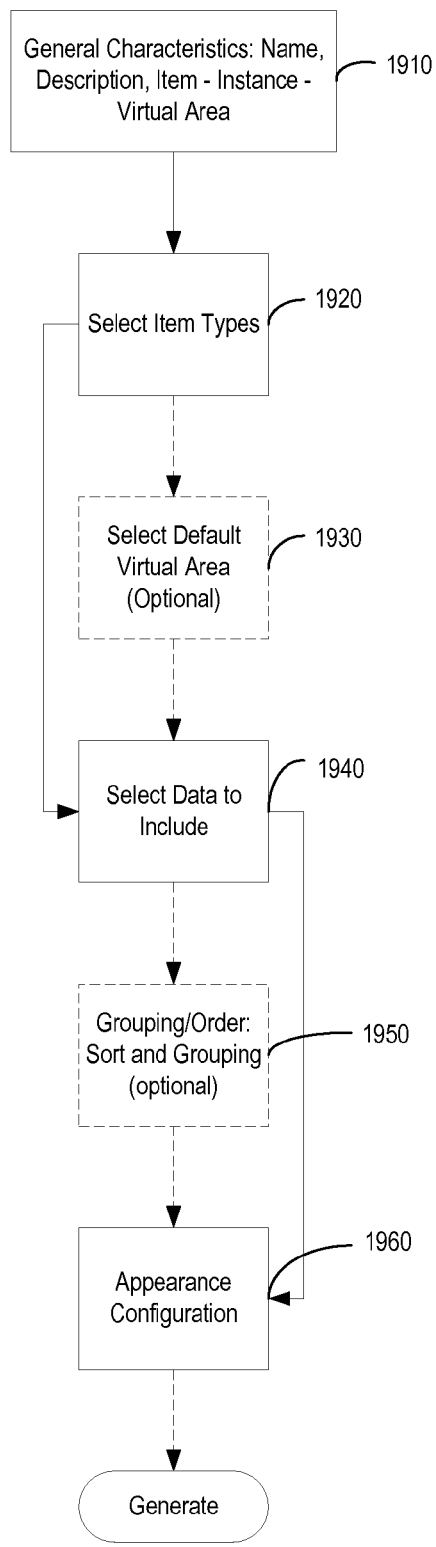
FIG. 19 is a depiction of the schedule building tool process flow.

A Schedule builder tool is provided to allow users to create two different types of item specification schedules (a list in tabular form). FIG. 19 shows the process flow for building schedules. The Schedule Builder tool enables one to schedule each instance in which the item specification occurs throughout the entire project and allows one to define an instance schedule report. The Schedule Builder tool also enables one to create reports based on item specifications and virtual area. It reports the quantities of item specifications in this project and allows one to define an item schedule report. Essentially, this is a search, collect, report and publish process.

The Item schedule template wizard process is shown in FIG. 19. A user will first enter general characteristics at 1910 about the schedule to be created. These can include the name, a description, and whether the schedule is an item based, virtual area based, or instance based schedule. Next, at step 1920, the user must select the item types to be included in the schedule. At step 1930, the user may optionally select a default virtual area for the schedule. At step 1940 the user is required to select the data to be included in the schedule. In this case, the available data can include item types, item specifications, item components, item quantities in virtual areas, instances or virtual areas. A further optional step is provided at 1950 wherein the user can select the sort order or grouping of the report. Finally, the user has the option of selecting formatting options at 1960 before generating the schedule at 1970.

Additional functions which may be added to the item schedule tool include but are not limited to the following: item schedule editor which allows project participant to edit specification in a the schedule grid; links to publishing tool including selection of a publications purpose which may defines whether or not the items are ready for purchase; exporting of schedule to other interfaces such as a CAD tool; etc.

Item Specification Schedule Report Tool

A Schedule Report tool is provided to allow one to run existing instance or item schedules for a specific virtual area or the entire property. These reports display on screen, an output of computer 1050, such as a display, and allow a user to print each schedule or save the schedule locally in a common format, such as Microsoft Corporation's Excel® spreadsheet program.

Publish Tool

A publishing tool allows the item specification to be published and allows the system to track any and all changes by renumbering each published version of an item specification. Publishing an official version of the items specification provides one form of version control. In one embodiment, the system prevents users from altering any information for that item specification without creating a new version. Versions are particular form or variation of an earlier or original type. System 1000 maintains a numerical format of versions for tracking history. Publishing also allows one to create an Item Specification Book. A unique feature of the online Item Specification Book is the ability for it to be shared as different media. The Item Specification Book may be viewed online, printed, or saved to the user's personal computer or laptop for later use.

Publishing an official version of the items specification provides one form of version control. In one embodiment, the system prevents users from altering any information for that item specification without creating a new revision. Revisions are particular form or variation of an earlier or original item. The system maintains a numerical format of versions for tracking history.

Figure 20:
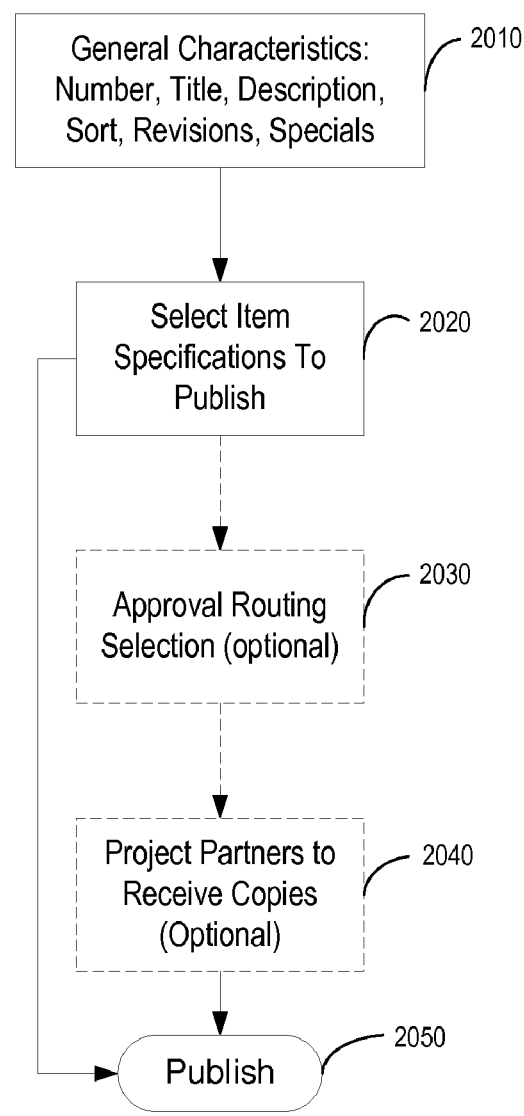
FIG. 20 is a depiction of the specification publishing tool process flow.

Publishing an item spec allows the item spec to be quoted, qualified, bid and purchased in the system of co-pending U.S. patent application Ser. No. 10/020,552. A flowchart of the publishing process is shown in FIG. 20. In publishing a specification or group of specifications, as shown in FIG. 20, a user will first enter the general characteristics of the publication, which may include entering the number, the title, a description, a sort order, whether any revisions are to be included, and other special characteristics of item specifications to be published. Next, at 2020, the user must select the item specifications to be published. The user may publish the specifications at this point at 2050, or may optionally provide a routing selection for those users in the approval path of the specifications at 2030, and my further optionally send copies to project partners as 2040.

Additional functions which may be added to the publish tool include but are not limited to the following: selection of a publications purpose which may define whether or not the items are ready for purchase; routing of the publication for approval; selection of specific project participants to publish the items to; etc.

After the item specs have been published, they may be revised to change the attributes or define further details for the item. This status is referred to as a revision. Revisions are tracked to ensure the most recent version of the item is used and allows the ability to revert to a previous version, if applicable.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A data structure for an asset management system, the data structure stored in a computer readable media, the asset including a plurality of physical items contained in the asset and defined in the data store, the structure comprising:
   at least one item type template defining for a subset of physical items a plurality of data fields characterizing the definition for the item type; and
   at least one specification for each physical item, the specification comprising a plurality of data values provided in the plurality of data fields defining the item type, said data fields including:
      at least one attribute value characterizing the item, wherein the at least one attribute is a functional attribute of the item; and
      at least one component value associating the at least one item type with a second item type.

2. The data structure of claim 1 wherein the at least one attribute further includes a physical attribute of the item.

3. The data structure of claim 1 wherein the specification further includes a virtual area association.

4. The data structure of claim 1 further including an item type data structure, including attribute definitions and component definitions.

5. The data structure of claim 1 further including at least one history tracking field identifying changes to data in said other fields.

6. The data structure of claim 5 wherein said history tracking field is updated based on a publication process.

7. The data structure of claim 1 further including an item type defining said data fields for at least one item specification.

8. The data structure of claim 1 further including a schedule definition comprising at least one specification.

9. A method for constructing data concerning item specifications in a system for managing an asset, the method implemented at least in part by a computing device, the asset including a plurality of items, comprising:
   providing a user data entry interface;
   defining at least one item type template comprising a plurality of data fields provided by a user to describe one of said items;
   receiving a plurality of data values for each of said plurality of items, each value being provided into a data field of said at least one type template on the interface, wherein the plurality of data values for each item comprise a specification for said item and each data field of the specification describes a functional attribute of the item and at least one component value associating the at least one item specification with a second item type, wherein the specification further includes a virtual area association; and
   storing the specification into a database on a computer system.

10. The method of claim 9 wherein the attribute further includes a physical attribute of the item.

11. The method of claim 9 wherein the method further includes:
   storing an item object in the database;
   creating a relationship between the item object and the specification;
   storing the relationship in the database.

12. The method of claim 9 wherein said step of providing occurs on a first computer and said step of storing occurs on a second computer.

13. The method of claim 12 wherein said step or providing includes providing said user data entry interface to a first computer and said step of receiving occurs on a second computer, and said first and second computers are coupled by a network.

14. The method of claim 13 wherein said network is the Internet.

15. The method of claim 9 wherein said step of providing comprises providing a template creation tool.

16. The method of claim 15 wherein said step of providing comprises providing a specification creation tool.

17. The method of claim 15 wherein said step of providing comprises providing a specification management tool.

18. The method of claim 9 wherein said step of receiving comprises: receiving said data values into one or more templates to create one or more specifications.

19. The method of claim 18 wherein said step of defining said template comprises:
   receiving general properties information; and
   receiving attribute information.

20. The method of claim 19 wherein said step of defining further includes receiving component information.

21. The method of claim 18 wherein said step of defining further includes receiving preferences information.

22. The method of claim 9 wherein said receiving step includes defining a configurable data object by performing at least one of a group consisting of the following:
   defining the configurable data object;
   adding an attribute to the configurable data object;
   modifying an attribute of the configurable data object; and
   removing an attribute from the configurable data object.

23. The method of claim 9 wherein the method includes the sub-step of configuring a configurable data object.

24. The method of claim 9 wherein the configurable data object comprises a specification for the item.

25. The method of claim 9 wherein the steps of providing and receiving are performed on a computer coupled to a network.

26. The method of claim 25 wherein the network is the Internet.

27. The method of claim 25 wherein the step of receiving is performed by receiving data from an item management application provided as part of the data entry interface.

28. A method of allowing users to manage an asset, the asset including a plurality of items having features and attributes, comprising:
   (a) providing an application server coupled to a network;
   (b) providing, responsive to a client request, an item specification management toolset including at least one template definition application;
   (c) providing at least one item type template for collecting information from a user including a plurality of data fields describing an item; and
   (d) receiving data from the client including at attribute value characterizing the item and at least one component value associating the at least one item type with a second item type for at least one item and storing said values in a database, wherein the at least one attribute is a functional attribute of the item.

29. The method of claim 28 wherein said step (b) comprises providing an item specification publisher.

30. The method of claim 28 wherein said step (b) comprises providing an item specification schedule builder.

31. The method of claim 28 wherein said step (b) comprises providing an attribute manager.

32. The method of claim 28 wherein said step (b) comprises providing a component manager.

33. The method of claim 28 wherein said step (b) comprises providing an item specification creation wizard.

34. The method of claim 28 wherein said step (c) comprises:
receiving data from the item specification management toolset including one of at least attribute data or component data.

35. A system for defining and managing an asset, the asset including a plurality of items associated with the asset, comprising:
a data store for item specification data provided on a host computer coupled to a network, each item specification including for one of the plurality of items at least one attribute value characterizing the item and at least one component value associating the item type with a second item type, wherein the specification further includes a virtual area association;
at least one item type template for collecting information from a user provided on the host computer, the template including a plurality of data fields; and
a data input toolset comprising at least an item specification creation tool, item type manager and an item specification manager.

36. The system of claim 35 further including an item specification publisher.

37. The system of claim 35 further including an item specification schedule builder.

38. The system of claim 35 wherein the item type manager includes an attribute manager.

39. The system of claim 35 wherein the item type manage includes a component manager.

40. The system of claim 35 wherein the data store and the data input toolset are provided on the host computer.

41. The system of claim 35 wherein the data store is provided on the host computer and the data input toolset is provided to a second, client computer.

42. The system of claim 35 wherein the toolset is provided by an applications server computer.

43. The system of claim 41 wherein the host computer is coupled to the Internet and the data input toolset is provided to a client computer via the Internet.

44. The system of claim 41 wherein the host computer is coupled to the Internet and the data store is accessible by a plurality of clients via the Internet.

45. The system of claim 35 further including a specification reference tracking facility.

46. The system of claim 35 further including a linking facility allowing project participants to link project areas to item specification data.

47. The system of claim 35 further including a permissions facility regulating the actions of project participants with respect to item specification data in the data store.

48. The system of claim 35 further including an approval routing tool based on a publication of at least one item specification.

49. The system of claim 35 further including a notification tool linked to specific actions affecting data in the data store and providing notifications to project participants when specific actions occur as defined by a user set business rules.

50. The system of claim 35 further including a history tracking system tracking changes to data in the data store.

* * * * *